(12) United States Patent
Yasutomi et al.

(10) Patent No.: US 11,691,651 B2
(45) Date of Patent: Jul. 4, 2023

(54) VEHICLE CONTROL APPARATUS AND METHOD

(71) Applicant: TOYOTA JIDOSHA KABUSHIKI KAISHA, Toyota (JP)

(72) Inventors: Taisuke Yasutomi, Ebina (JP); Yoji Kunihiro, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 220 days.

(21) Appl. No.: 17/081,049

(22) Filed: Oct. 27, 2020

(65) Prior Publication Data

US 2021/0269062 A1 Sep. 2, 2021

(30) Foreign Application Priority Data

Feb. 27, 2020 (JP) ................................. 2020-031820

(51) Int. Cl.
*B60W 30/12* (2020.01)
*G06T 7/50* (2017.01)
(Continued)

(52) U.S. Cl.
CPC ........ *B60W 60/0057* (2020.02); *B60W 30/12* (2013.01); *G06T 7/50* (2017.01);
(Continued)

(58) Field of Classification Search
CPC ............. B60W 60/0057; B60W 30/12; B60W 2552/53; B60W 2555/20; B60W 2554/80;
(Continued)

(56) References Cited

U.S. PATENT DOCUMENTS 10,496,090 B2 * 12/2019 Latotzki .............. B60W 30/095
2005/0270145 A1 12/2005 Kataoka et al.
(Continued)

FOREIGN PATENT DOCUMENTS

JP 2006-315491 A 11/2006
JP 2008-195402 A 8/2008
(Continued)

OTHER PUBLICATIONS

Yong Zhou, A robust lane detection and tracking method based on computer vision, Feb. 21, 2006, Institute of Physics Publishing, Measurement Science and Technology, 17 (2006) 736-745 (Year: 2006).*

*Primary Examiner* — Elaine Gort
*Assistant Examiner* — Matthias S Weisfeld
(74) *Attorney, Agent, or Firm* — Sughrue Mion, PLLC

(57) ABSTRACT

Provided is a control apparatus for a vehicle configured to perform driving support control when a driving support operation state is an on state, the control apparatus being further configured to, in a case where the driving support operation state is the on state and a driving operation switching request for changing the driving support operation state to an off state is issued, calculate a target speed at a driving operation switching time point at which the driving support operation state is changed from the on state to the off state, and perform deceleration control for decelerating the vehicle such that a speed of the vehicle matches the target speed at the driving operation switching time point.

10 Claims, 12 Drawing Sheets

(51) Int. Cl.
  *B60W 60/00* (2020.01)
  *G06V 20/56* (2022.01)

(52) U.S. Cl.
  CPC ....... *G06V 20/588* (2022.01); *B60W 2420/42* (2013.01); *B60W 2552/53* (2020.02); *B60W 2554/80* (2020.02); *B60W 2555/20* (2020.02); *B60W 2710/20* (2013.01); *B60W 2720/10* (2013.01); *B60W 2720/12* (2013.01); *G06T 2207/30256* (2013.01)

(58) Field of Classification Search
  CPC ......... B60W 2420/42; B60W 2710/20; B60W 2720/10; B60W 2720/12; G06T 7/50; G06T 2207/30256; G06V 20/588
  USPC .......................................................... 701/28
  See application file for complete search history.

(56) References Cited

U.S. PATENT DOCUMENTS

| | | | |
|---|---|---|---|
| 2006/0025918 A1 | 2/2006 | Saeki | |
| 2016/0012298 A1* | 1/2016 | Maeda | G06T 7/60 382/104 |
| 2018/0204073 A1* | 7/2018 | Kawano | B60W 30/12 |
| 2019/0054919 A1 | 2/2019 | Noto et al. | |
| 2019/0056732 A1 | 2/2019 | Aoi et al. | |
| 2019/0155279 A1 | 5/2019 | Tayama | |
| 2019/0232970 A1* | 8/2019 | Watanabe | B60W 30/143 |
| 2019/0304309 A1 | 10/2019 | Sakamoto et al. | |
| 2020/0079395 A1 | 3/2020 | Ibuka et al. | |
| 2020/0130697 A1* | 4/2020 | Insana | B60W 40/06 |
| 2020/0189619 A1 | 6/2020 | Honda | |
| 2021/0009137 A1* | 1/2021 | Herman | B60W 30/146 |

FOREIGN PATENT DOCUMENTS

| | | | |
|---|---|---|---|
| JP | 4172434 B2 | 10/2008 | |
| JP | 2009-190464 A | 8/2009 | |
| JP | 4349210 B2 | 10/2009 | |
| JP | 2010-006279 A | 1/2010 | |
| JP | 2014-148293 A | 8/2014 | |
| JP | 2017-030390 A | 2/2017 | |
| JP | 2017-97518 A | 6/2017 | |
| JP | 2017-154542 A | 9/2017 | |
| JP | 2018-101199 A | 6/2018 | |
| JP | 2018-149822 A | 9/2018 | |
| JP | 2019-021154 A | 2/2019 | |
| WO | WO-0033151 A1 * | 6/2000 | ......... B60K 31/0008 |
| WO | 2018/109868 A1 | 6/2018 | |
| WO | 2019/049269 A1 | 3/2019 | |

\* cited by examiner

VEHICLE CONTROL APPARATUS AND METHOD

CROSS-REFERENCES TO RELATED APPLICATION

The present application claims priority to Japanese patent application No. JP 2020-31820 filed on Feb. 27, 2020, the content of which is hereby incorporated by reference in its entirety.

BACKGROUND

1. Technical Field

The present disclosure relates to a vehicle control apparatus and a vehicle control method.

2. Description of the Related Art

Hitherto, there has been known a control apparatus for a vehicle configured to perform speed control for controlling a speed of the vehicle without requiring operation on an accelerator pedal and/or a brake pedal (see Japanese Patent Application Laid-open No. 2018-101199).

An example of such speed control is Adaptive Cruise Control (hereinafter simply referred to as "ACC"). The ACC includes constant speed travel control for controlling the speed of the vehicle such that the speed matches (becomes equal to) a preset target speed.

Further, in recent years, there has been developed a control apparatus for a vehicle configured to perform autonomous driving control for automatically controlling a speed and steering angle of the vehicle. Hereinafter, the above-mentioned control for automatically driving the vehicle such as the ACC and the autonomous driving control will be referred to as "driving support control".

There may be a case where the driving of the vehicle is switched from the driving support control to manual driving by a driver due to a request from a system or the driver. A time point at which such a switching is performed will be referred to as "driving operation switching time point". A related-art apparatus is configured to perform the constant speed travel control until the driving operation switching time point.

In a case where the vehicle travels on a road 1 or 2 described below, the driver usually decelerates the vehicle in order to improve safety.
(Road 1) A road (curve) having a curvature larger than a predetermined curvature.
(Road 2) A road in which an object (for example, another vehicle) exists at the side of the road.

However, during performance of the constant speed travel control, the speed of the vehicle is maintained at the target speed without being decelerated. Even if the vehicle is to travel on the road 1 or 2 after the driving operation switching time point, the speed of the vehicle is maintained at the target speed. Therefore, the vehicle may travel at a speed faster than a speed desired by the driver at the driving operation switching time point. This may give the driver a sense of unease. Furthermore, after the driving operation switching time point, the driver has to decelerate the vehicle by his/her driving operation (i.e., brake pedal operation).

SUMMARY

The present disclosure provides a control apparatus capable of controlling the speed of the vehicle in accordance with a situation in front of the vehicle in a case where the driving of the vehicle is switched from the driving support control to the manual driving by the driver.

In one or more embodiments, there is provided a control apparatus for a vehicle. The control apparatus includes: an information acquisition device configured to acquire vehicle-surroundings information which is information on a surroundings situation of the vehicle, and a controller configured to perform driving support control including at least speed control for controlling a speed of the vehicle when a driving support operation state is an on state. The controller is further configured to, in a case where the driving support operation state is the on state and a driving operation switching request for changing the driving support operation state from the on state to an off state is issued, change the driving support operation state from the on state to the off state at a driving operation switching time point at which a predetermined time has elapsed from a request time point at which the driving operation switching request is issued. The controller is further configured to, in the case where the driving support operation state is the on state and the driving operation switching request is issued, calculate a target speed at the driving operation switching time point in accordance with a situation in front of the vehicle determined based on the vehicle-surroundings information acquired at the request time point, perform deceleration control in place of the speed control, and terminate the deceleration control at the driving operation switching time point. The deceleration control is control such that the speed of the vehicle matches the target speed at the driving operation switching time point.

According to the above configuration, the control apparatus calculates the target speed at the driving operation switching time point in accordance with the situation in front of the vehicle, and decelerates the vehicle such that the speed of the vehicle matches the target speed. Therefore, it is possible to increase the possibility that the vehicle travels at a speed desired by a driver at the driving operation switching time point.

In one or more embodiments, the information acquisition device is configured to acquire, as the vehicle-surroundings information, image data including a left lane line and a right lane line (left and right lane markings) which define a lane in which the vehicle travels. The controller is further configured to, in the case where the driving support operation state is the on state and the driving operation switching request is issued, calculate a first distance and a second distance, select a shorter one of the first distance and the second distance as a distance parameter, and calculate the target speed by using the distance parameter. The first distance is a distance between a position at the request time point of the vehicle and an edge of the left lane line, which is farthest in a travel direction of the vehicle, recognized from the image data at the request time point, and the second distance is a distance between the position at the request time point of the vehicle and an edge of the right lane line, which is farthest in the travel direction of the vehicle, recognized from the image data at the request time point.

In a case where the vehicle travels on the above-described road 1 or 2 after the driving operation switching time point, one of the first distance and the second distance becomes smaller than the other. According to the above configuration, the control apparatus selects the smaller one of the first distance and the second distance as the distance parameter, and calculates the target speed by using the distance parameter. In this manner, the control apparatus can set the target speed for the deceleration control in accordance with the recognition result of the left lane line and the right lane line in front of the vehicle.

In one or more embodiments, the controller is further configured to perform, as the driving support control, steering control for controlling a steering angle of the vehicle such that the vehicle travels along a predetermined target travel line. The controller is further configured to, in the case where the driving support operation state is the on state and the driving operation switching request is issued, set the target travel line by shifting to a side of a specific lane line the target travel line used until the request time point, and perform the steering control such that the vehicle travels along the set target travel line. The specific lane line is a lane line corresponding a longer one of the first distance and the second distance.

It is assumed that the driving operation switching request is issued in a situation in which the vehicle travels at a position short of a curve. In this situation, according to the above configuration, at the driving operation switching time point, the vehicle travels at a position where the driver can easily recognize the situation of the curve. Further, it is assumed that the driving operation switching request is issued in a situation in which the vehicle travels on a lane in which an object (other vehicle) exists. In this situation, according to the above configuration, the vehicle travels at a distance from the other vehicle at the driving operation switching time point.

In one or more embodiments, the controller is further configured to set, as the target speed, a speed allowing the vehicle to be stopped at a position away from the position at the request time point of the vehicle by the distance parameter, under an assumption that a driver decelerates the vehicle at a predetermined deceleration after the driving operation switching time point.

It is assumed that, after the driving operation switching time point, the driver operates a brake pedal to decelerate the vehicle at the predetermined deceleration. According to the above configuration, under the above assumption, it is possible to increase the possibility that the vehicle is stopped at a position short of the curve or the object existing in the lane.

In one or more embodiments, the controller is further configured to, in the case where the driving support operation state is the on state and the driving operation switching request is issued, determine whether or not a driver is in a manual driving possible state in which the driver can drive the vehicle, and set the target speed of when determining the driver is not in the manual driving possible state to be smaller than the target speed of when determining the driver is in the manual driving possible state.

According to the above configuration, when the driver is not in the manual driving possible state, the target speed becomes smaller, and therefore, the safety can be further improved.

In one or more embodiments, the controller is further configured to, in the case where the driving support operation state is the on state and the driving operation switching request is issued, determine whether or not a road surface state in front of the vehicle is a specific road surface state in which wheels of the vehicle are more slippery than an assumed dry road surface state, and set the target speed of when determining the road surface state is the specific road surface state to be smaller than the target speed of when determining the road surface state is not the specific road surface state.

According to the above configuration, when the road surface state in front of the vehicle is the specific road surface state, the target speed becomes smaller, and therefore, the safety can be further improved.

In one or more embodiments, there is provided a control method for a vehicle including an information acquisition device and a controller. The control method includes: acquiring by the information acquisition device vehicle-surroundings information which is information on a surroundings situation of the vehicle, and performing by the controller driving support control including at least speed control for controlling a speed of the vehicle when a driving support operation state is an on state. The control method further includes: in a case where the driving support operation state is the on state and a driving operation switching request for changing the driving support operation state from the on state to an off state is issued, changing by the controller the driving support operation state from the on state to the off state at a driving operation switching time point at which a predetermined time has elapsed from a request time point at which the driving operation switching request is issued, calculating by the controller a target speed at the driving operation switching time point in accordance with a situation in front of the vehicle determined based on the vehicle-surroundings information acquired at the request time point, performing by the controller deceleration control in place of the speed control, and terminating by the controller the deceleration control at the driving operation switching time point. The deceleration control is control such that the speed of the vehicle matches the target speed at the driving operation switching time point.

According to one or more embodiments, the above-mentioned controller is implemented by a microprocessor programmed for performing one or more operations and/or functionality described herein. In addition, the controller may be implemented, in whole or in part, by specifically configured to hardware (e.g., by one or more application specific integrated circuits or ASIC(s)).

DESCRIPTION OF THE EMBODIMENTS

First Embodiment (Configuration)

Figure 1:
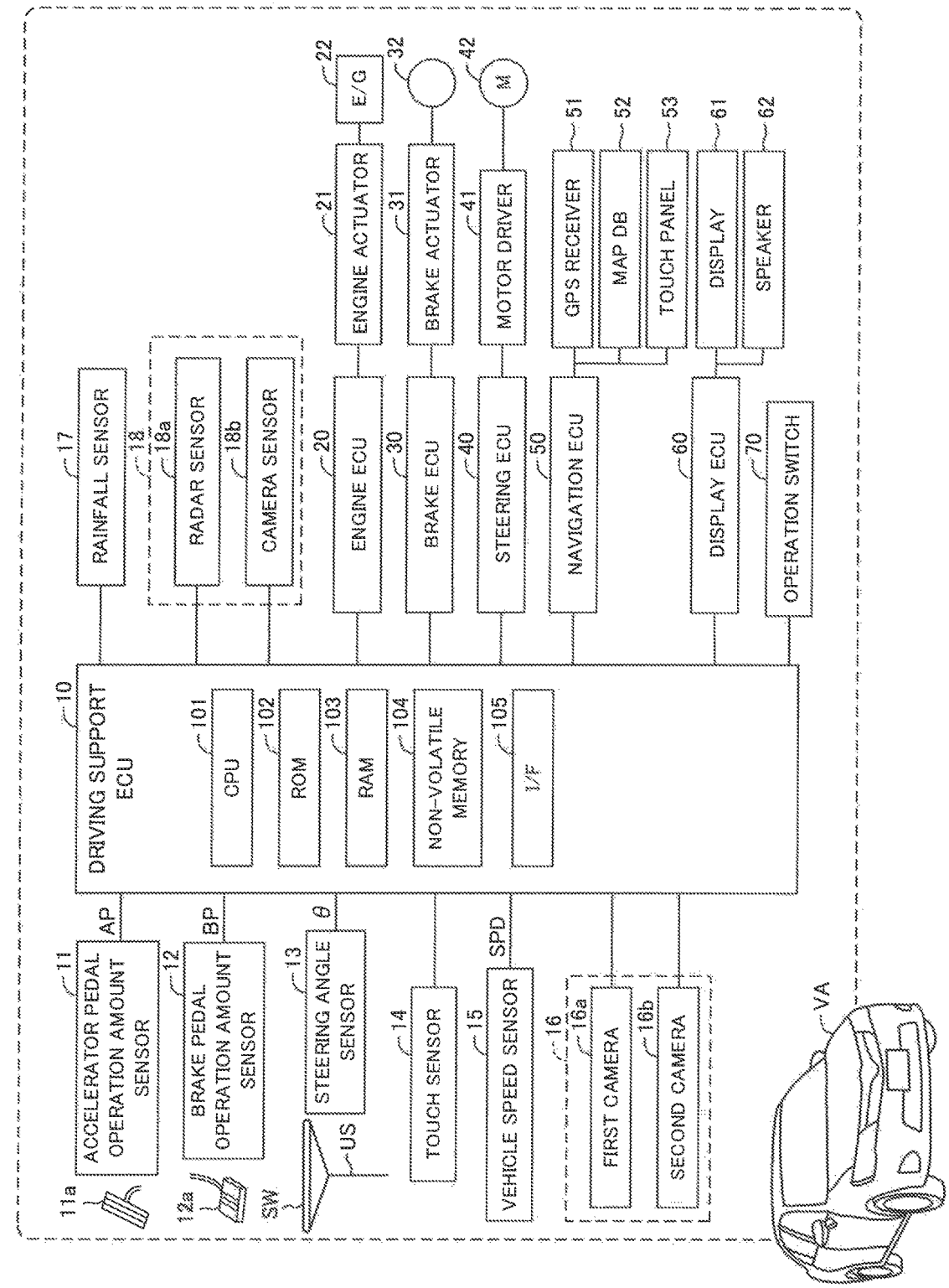
FIG. 1 is a schematic configuration diagram of a control apparatus for a vehicle according to a first embodiment.

As illustrated in FIG. 1, a control apparatus (hereinafter may be referred to as "first apparatus") according to a first embodiment is applied to a vehicle VA. The control apparatus includes a driving support ECU 10, an engine ECU 20, a brake ECU 30, a steering ECU 40, a navigation ECU 50, and a display ECU 60. Those ECUs are electric control units each including a microcomputer as a main part, and are connected to each other such that information can be transmitted and received to and from each other via a controller area network (CAN) (not shown).

The microcomputer herein includes a CPU, a ROM, a RAM, a non-volatile memory, an interface I/F, and the like. For example, the driving support ECU 10 includes a microcomputer including a CPU 101, a ROM 102, a RAM 103, a non-volatile memory 104, an interface (I/F) 105, and the like. The CPU executes instructions (programs and routines) stored in the ROM to realize various functions.

The driving support ECU 10 is connected to sensors and cameras listed below, and is configured to receive detection signals or output signals from those sensors and cameras.

An accelerator pedal operation amount sensor 11 is configured to detect an operation amount (accelerator opening) AP of an accelerator pedal 11a, and output a signal indicative of the accelerator pedal operation amount AP. A brake pedal operation amount sensor 12 is configured to detect an operation amount BP of a brake pedal 12a, and output a signal indicative of the brake pedal operation amount BP.

A steering angle sensor 13 is configured to detect a steeling angle θ of a steering wheel SW, and output a signal indicative of the steering angle θ. A value of the steering angle θ becomes a positive value when the steering wheel SW is rotated in a first direction (left direction) from a predetermined reference position (neutral position). The value of the steering angle θ becomes a negative value when the steering wheel SW is rotated in a second direction (right direction) opposite to the first direction from the reference position. The neutral position is a position at which the steering angle θ is zero, and is thus a position of the steering wheel SW at a time when the vehicle travels straight.

A touch sensor 14 is provided on the steering wheel SW, and configured to output a signal indicative of whether a driver is holding the steering wheel SW. A vehicle speed sensor 15 is configured to detect a travel speed SPD of the vehicle VA (that is, vehicle speed), and output a signal indicative of the vehicle speed SPD.

A driver monitor camera 16 includes a first camera 16a and a second camera 16b. The first camera 16a photographs a face of the driver to acquire image data, and detects an orientation (direction) of the driver's face based on the image data. The second camera 16b photographs an area including a foot of the driver, the accelerator pedal 11a and the brake pedal 12a to acquire image data, and detects the position of the foot of the driver based on the image data.

A rainfall sensor 17 is arranged on an upper central part of a windshield surface of the vehicle VA. The rainfall sensor 17 includes a light emitting element. The light emitting element irradiates the windshield surface with light. The rainfall sensor 17 measures a change in reflected light to detect precipitation information (that is, presence or absence of precipitation), and outputs a signal indicative of the precipitation information.

An ambient sensor 18 is configured to acquire vehicle-surroundings information which is information on a surroundings situation of the vehicle VA. Specifically, the ambient sensor 18 acquires information on a road (including a lane in which the vehicle VA travels) around the vehicle VA, and information on three-dimensional objects present on the road. Examples of the three-dimensional objects include moving objects such as pedestrians, automobiles and bicycles, as well as stationary objects such as guard rails, fences and buildings. In the following description, these three-dimensional objects are simply referred to as "objects". The ambient sensor 18 includes a radar sensor 18a and a camera sensor 18b.

The radar sensor 18a radiates, for example, a radio wave in a millimeter wave band (hereinafter referred to as "millimeter wave") to a peripheral region including at least a front region of the vehicle VA, and receives a millimeter wave (namely, a reflected wave) reflected by an object existing in the radiation range. Further, the radar sensor 18a determines whether or not an object exists ahead of the vehicle VA, and calculates information on a relative relationship between the vehicle and the object. The information on the relative relationship between the vehicle and the object includes a distance between the vehicle and the object, an orientation (position) of the object with respect to the vehicle, a relative speed between the vehicle and the object, and other such parameters. Hereinafter, the information obtained by the radar sensor 18a (including the information on the relative relationship between the vehicle and the object) will be referred to as "object information".

The camera sensor 18b photographs/captures a scene in front of the vehicle to acquire image data. The camera sensor 18b recognizes, based on the image data, a left lane line and a right lane line (e.g., left and right white lines) which define a lane in which the vehicle travels. The camera sensor 18b calculates a parameter (for example, curvature) indicating the shape of the lane, a parameter indicating a positional relationship between the vehicle and the lane, and other such parameters. The parameter indicating the positional relationship between the vehicle and the lane includes a distance between the center position in a vehicle width direction of the vehicle and a position on the left white line, and a distance between the center position in the vehicle width direction of the vehicle and a position on the right white line. Hereinafter, the above-mentioned information obtained by the camera sensor 18b (including the parameters and the image data) will be referred to as "lane information". In one or more embodiments, the camera sensor 18b may be configured to, based on the image data, determine whether or not an object exists ahead of the vehicle VA, and calculate the object information.

The ambient sensor 18 outputs the object information and the lane information to the driving support ECU 10 as the vehicle-surroundings information. The ambient sensor 18 may be referred to as "information acquisition device configured to acquire the vehicle-surroundings information".

The engine ECU 20 is connected to an engine actuator 21. The engine actuator 21 includes a throttle valve actuator configured to change an opening degree of a throttle valve of an engine 22. The engine ECU 20 can drive the engine actuator 21 to change a torque generated by the engine 22. The torque generated by the engine 22 is transmitted to drive wheels via a transmission (not shown). Thus, the engine ECU 20 can control the engine actuator 21 to control a driving force of the vehicle VA, to thereby change an acceleration or acceleration state of the vehicle VA. In one or more embodiments, the vehicle VA may include a motor as a vehicle driving source in place of or in addition to the engine 22.

The brake ECU 30 is connected to a brake actuator 31 which is a hydraulic control actuator. The brake actuator 31 includes a hydraulic circuit. The hydraulic circuit includes a master cylinder, flow paths through which brake fluid flows, a plurality of valves, pumps, and motors configured to drive the pumps. The brake actuator 31 adjusts a hydraulic pressure to be supplied to a wheel cylinder in a brake mechanism 32 in accordance with an instruction from the brake ECU 30. The hydraulic pressure causes the wheel cylinder to generate a friction braking force for a wheel. Thus, the brake ECU 30 can control the brake actuator 31 to control the braking force of the vehicle VA, to thereby change an acceleration state (a deceleration, namely, a negative acceleration) of the vehicle VA.

The steering ECU 40 is a control device for a widely-known electric power steering system, and is connected to a motor driver 41. The motor driver 41 is connected to a motor 42. The motor 42 is integrated in a steering mechanism. The steering mechanism includes the steering wheel SW, a steering shaft coupled to the steering wheel SW, a gear mechanism for steering, and the like. The motor 42 generates torque by electric power supplied from a battery (not shown) via the motor driver 41, and can generate steering assist torque or steer left and right steered wheels by the torque. Thus, the motor 42 can change the steering angle of the vehicle VA.

The navigation ECU 50 is connected to a GPS receiver 51, a map database (DB) 52, and a touch panel 53. The GPS receiver 51 is configured to receive GPS signals for detecting the "latitude and longitude" of the place where the vehicle is present. The map DB 52 stores map information. The map information includes information on roads (road information), and information on buildings (building information). The road information includes positions of a plurality of lane lines (lane markings) which define a road, a width of the road defined by the plurality of lane lines, and a curvature of the road. The navigation ECU 50 performs various arithmetic processes based on the latitude and longitude of the place where the vehicle is located and the map information, and causes the touch panel 53 to display the position of the vehicle on the map.

The display ECU 60 is connected to a display 61 and a speaker 62. The display 61 is a multi-information display disposed in front of the driver's seat. When the speaker 62 receives a sound command from the driving support ECU 10, the speaker 62 utters/generates a sound according to the sound command. The display 61 and the speaker 62 may be collectively referred to as "notification device".

An operation switch 70 is a switch to be operated by the driver. The driver operates the operation switch 70 to set an operation state of the driving support control (in this example, the ACC) to an on state or an off state. Hereinafter, the operation state of the driving support control will be referred to as "driving support operation state".

(ACC)

Hereinafter, the driving support ECU 10 will be simply referred to as "ECU 10". The ECU 10 is configured to perform the ACC as one mode of the driving support control (see, for example, Japanese Patent Application Laid-Open No. 2014-148293, Japanese Patent Application Laid-Open No. 2006-315491, and Japanese Patent No. 4172434).

The ACC includes two types of controls for controlling the speed of the vehicle VA; i.e., constant speed travel control, and preceding-vehicle following-travel control. The constant speed travel control is control for controlling/adjusting the speed of the vehicle VA such that the travel speed of the vehicle VA matches (becomes equal to) a target speed (set speed) Vset, without requiring operations of the accelerator pedal 11a and the brake pedal 12a. The preceding-vehicle following-travel control is control for causing the vehicle VA to follow a preceding vehicle (following target vehicle) traveling in the front area of the vehicle VA while maintaining an inter-vehicle distance between the preceding vehicle and the vehicle VA at a target inter-vehicle distance Dset, without requiring operations of the accelerator pedal 11a and the brake pedal 12a. The following target vehicle is a vehicle which is traveling ahead of (immediately ahead of) the vehicle VA and which is to be followed by the vehicle VA.

As the driving support operation state is set to the on state in response to the operation with respect to the operation switch 70, the ECU 10 determines, on the basis of the object information, whether or not the following target vehicle is present. When the ECU 10 determines that the following target vehicle is not present, the ECU 10 performs the constant speed travel control. The ECU 10 determines a target acceleration Gtgt based on the vehicle speed SPD and a target speed Vset such that the vehicle speed SPD matches (becomes equal to) the target speed Vset. In order that the acceleration of the vehicle VA matches the target acceleration Gtgt, the ECU 10 controls the driving force by controlling the engine actuator 21 by using the engine ECU 20 and, when necessary, controls the braking force by controlling the brake actuator 31 by using the brake ECU 30.

On the other hand, when the ECU 10 determines that the following target vehicle is present, the ECU 10 performs the preceding-vehicle following-travel control. Specifically, the ECU 10 multiplies a target inter-vehicle time Tw by the vehicle speed SPD to obtain a target inter-vehicle distance Dset (Dset=Tw×SPD). The target inter-vehicle time Tw is set by using an inter-vehicle time switch (not shown). The ECU 10 determines the target acceleration Gtgt such that the inter-vehicle distance between the vehicle VA and the following target vehicle matches (becomes equal to) the target inter-vehicle distance Dset. In order to render the acceleration of the vehicle VA coincident with the target acceleration Gtgt, as described above, the ECU 10 controls the driving force by controlling the engine actuator 21 by using the engine ECU 20 and, when necessary, controls the braking force by controlling the brake actuator 31 by using the brake ECU 30.

(Driving Operation Switching Request)

The ECU 10 determines whether or not a driving operation switching request is issued in a situation in which the driving support operation state is the on state. The driving operation switching request is a request for changing the driving support operation state from the on state to the off state. The driving operation switching request includes a first request issued when a predetermined abnormality is detected, and a second request issued according to the operation on the operation switch 70 by the driver. The abnormality includes an abnormality in the driving support system. In one or more embodiments, the predetermined abnormality includes at least one of an abnormality in at least one of the sensors 11 to 18, an abnormality in the notification device, an abnormality in the engine actuator 21, an abnormality in the brake actuator 31, and an abnormality in a component of the steering mechanism (for example, the motor 42). The ECU 10 executes a routine (not shown) to monitor whether or not the predetermined abnormality has occurred.

A period until an elapsed time Tep since the driving operation switching request is issued reaches a predetermined time threshold Tmth is a transition period for transferring the driving operation of the vehicle VA from the ACC to the driver. During the transition period, the driving support operation state is maintained in the on state. At an end time point of the transition period, the driving support operation state is changed from the on state to the off state. Therefore, the end time point of the transition period corresponds to the above-mentioned driving operation switching time point.

During the transition period, the ECU 10 determines whether or not the driver is in a state in which the driver can drive/operate the vehicle VA by himself/herself. Hereinafter, such a state will be referred to as "manual driving possible state". In other words, the manual driving possible state refers to a state in which the driver is ready to drive/operate the vehicle VA. Specifically, the ECU 10 determines that the driver is in the manual driving possible state when both of the following conditions A and B are satisfied.

(Condition A): The driver is in a state 1 or 2 described below.

(Condition B): The driver is in a state 3 described below.

(State 1): The driver operates the accelerator pedal 11a, or the driver puts his/her foot on the accelerator pedal 11a. The ECU 10 can determine whether the driver is in the state 1 based on the signal from the accelerator pedal operation amount sensor 11 and the signal from the second camera 16b of the driver monitor camera 16.

(State 2): The driver operates the brake pedal 12a, or the driver puts his/her foot on the brake pedal 12a. The ECU 10 can determine whether the driver is in the state 2 based on the signal from the brake pedal operation amount sensor 12 and the signal from the second camera 16b of the driver monitor camera 16.

(State 3): The driver's line of sight is directed forward of the vehicle VA. The ECU 10 can determine whether the driver is in the state 3 based on the signal from the first camera 16a of the driver monitor camera 16.

In one or more embodiments, even if the driver operates the accelerator pedal 11a in the transition period, the ECU 10 may control the engine ECU 20 so as not to accelerate the vehicle VA in response to the operation of the driver. In one or more embodiments, when the driver operates the brake pedal 12a in the transition period, the ECU 10 may control the brake ECU 30 so as not to decelerate the vehicle VA in response to the operation of the driver.

The ECU 10 executes alert processing until the ECU 10 determines that the driver is in the manual driving possible state during the transition period.

Once the ECU 10 determines that the driver is in the manual driving possible state in the transition period, the ECU 10 does not determine whether the driver is in the manual driving possible state in a period from that determination time point to the end time point of the transition period.

(Control during Transition Period)

As described above, since the related-art apparatus performs the constant speed travel control until the driving operation switching time point, the vehicle may travel at a speed faster than a speed desired by the driver at the driving operation switching time point. This may give the driver a sense of unease.

In view of the above, the ECU 10 calculates a target speed Vtgt that the vehicle VA should reach at the driving operation switching time point, in accordance with a situation in front of the vehicle VA determined based on the vehicle-surroundings information at a time point (request time point) at which the driving operation switching request is issued. Then, the ECU 10 performs deceleration control for decelerating the vehicle VA such that the speed of the vehicle VA matches (becomes equal to) the target speed Vtgt at the driving operation switching time point, in place of the constant speed travel control or the preceding-vehicle following-travel control in the ACC. The ECU 10 terminates the deceleration control at the driving operation switching time point.

Specifically, the ECU 10 recognizes the left white line and the right white line which define the lane, based on the lane information (the image data ahead of the vehicle VA acquired by the camera sensor 18b). For example, in a case where the vehicle VA travels on the above-mentioned road 1 or 2, the ECU 10 cannot recognize one or both of the left white line and the right white line up to a position far from the current position of the vehicle VA. Therefore, the ECU 10 controls the acceleration of the vehicle VA by using the left white line and the right white line which can be recognized based on the lane information. Hereinafter, control performed in the transition period will be referred to as "specific control".

Figure 2:
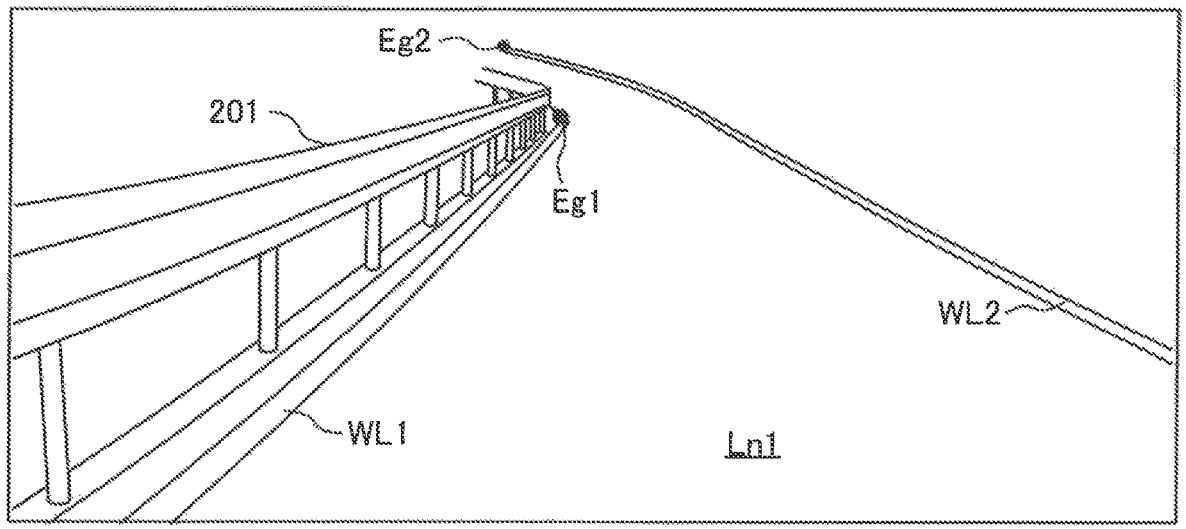
FIG. 2 is a diagram for illustrating image data acquired by a camera sensor of FIG. 1 in a situation in which the vehicle travels at a position short of a left curve.

It is assumed that the driving operation switching request is issued in a situation in which the vehicle VA travels at a position short of a left curve. In this case, the ECU 10 acquires image data illustrated in FIG. 2 from the camera sensor 18b. The image data includes a left white line WL1 and a right white line WL2 which define a lane Ln1. Due to the influence of a guardrail 201 installed on the left side of the lane Ln1, the ECU 10 cannot recognize the left white line WL1 up to a position far from the current position of the vehicle VA based on the image data. In such a case, the ECU 10 performs the specific control as described below.

First, the ECU 10 recognizes an edge Eg1 of the left white line WL1 and an edge Eg2 of the right white line WL2 from the image data acquired at the current position of the vehicle VA (i.e., position of the vehicle VA at the time when the driving operation switching request is issued). The edge Eg1 of the left white line WL1 refers to an edge portion of the left white line WL1 farthest from the current position of the vehicle VA in the travel direction of the vehicle VA. The edge Eg2 of the right white line WL2 refers to an edge portion of the right white line WL2 farthest from the current position of the vehicle VA in the travel direction of the vehicle VA. In addition, in a case where the white line is interrupted in the image data, the ECU 10 recognizes the interrupted position as the edge Eg1 or Eg2 of the white line (see FIG. 5).

Figure 3:
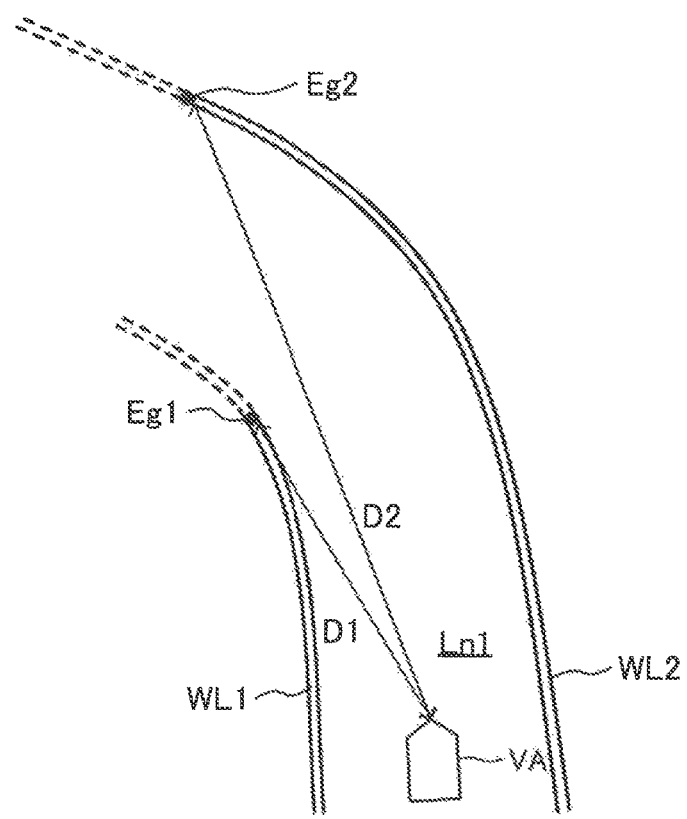
FIG. 3 is a plan view for explaining processing executed when a driving operation switching request is issued in the situation of FIG. 2.

Next, as illustrated in FIG. 3, the ECU 10 calculates a first distance D1 between the current position of the vehicle VA and the edge Eg1 of the left white line WL1, and a second distance D2 between the current position of the vehicle VA and the edge Eg2 of the right white line WL2.

In the situation in which the vehicle VA travels at the position short of the left curve, the first distance D1 is shorter than the second distance D2. In this way, in the case where the vehicle VA is to travel in the curve after the driving operation switching time point, it is considered that one of the first distance D1 and the second distance D2 becomes shorter than the other. Thus, the ECU 10 sets the smaller one of the first distance D1 and the second distance D2 as a distance parameter Da for the specific control. In the situation of FIG. 3, the ECU 10 sets the first distance D1 as the distance parameter Da (Da<–D1).

In a case where neither the left white line WL1 nor the right white line WL2 can be recognized based on the image data, the ECU 10 sets a predetermined default distance Ddef as the distance parameter Da (Da<–Ddef).

Next, the ECU 10 calculates the target speed Vtgt according to the expression (1) described below. The target speed Vtgt is a target value of the vehicle speed SPD at the driving operation switching time point (that is, at the end time point of the transition period). In the expression (1), SPD is the vehicle speed at the time when the driving operation switching request is issued. Gs is a predetermined negative acceleration (deceleration), which is assumed to be obtained when the driver operates the brake pedal 12*a* with a normal operation amount (depression amount). Hereinafter, Gs will be referred to as "deceleration Gs". Tmth is a time threshold indicative of the length of the transition period.

$$Vtgt = \sqrt{2 \cdot |Gs| \cdot (Da - (SPD \cdot Tmth))} \quad (1)$$

Figure 4:
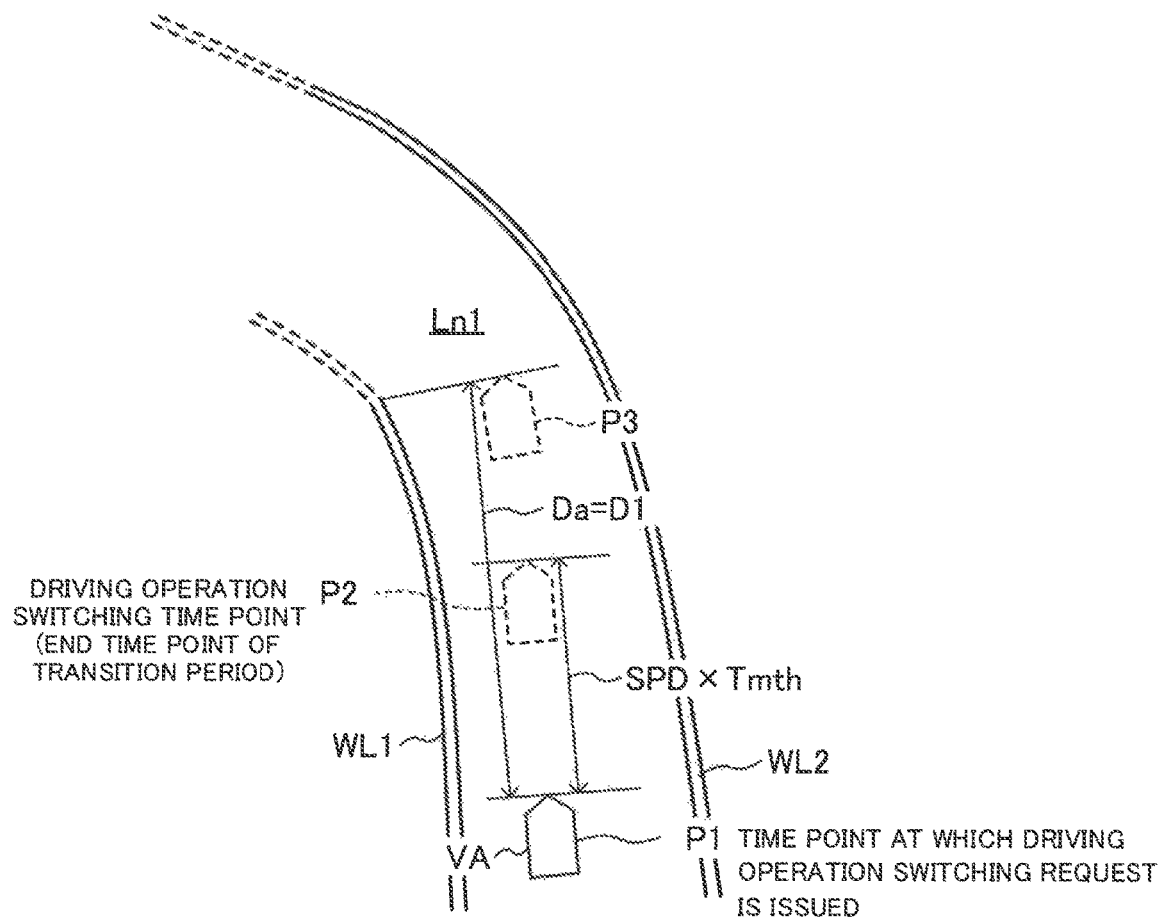
FIG. 4 is a plan view for explaining processing executed when the driving operation switching request is issued in the situation of FIG. 2.

As illustrated in FIG. 4, the vehicle travels at a position P1 at a time point at which the driving operation switching request is issued. It is assumed that the vehicle VA travels by the distance "SPD×Tmth" during the transition period. It should be noted that, as described later, the ECU 10 causes the vehicle VA to be decelerated or to travel at a constant speed during the transition period, and therefore, the travel distance during the transition period is SPD×Tmth or less. According to the above assumption, the vehicle VA reaches a position P2 at the driving operation switching time point. The target speed Vtgt means a speed allowing the vehicle VA to be stopped at a position away from the current position (i.e., the position of the vehicle at the time when the driving operation switching request is issued) by the distance parameter Da, under an assumption that the driver decelerates the vehicle VA at the deceleration Gs after the driving operation switching time point. Therefore, in the situation of FIG. 4, in a case where the driver operates the brake pedal 12*a* with the normal operation amount from the driving operation switching time point, the vehicle VA is decelerated at the deceleration Gs, and as a result, the vehicle VA is stopped at a position P3 away from the position P1 by the first distance D1 (=Da).

When the target speed Vtgt is lower than the speed SPD at the time when the driving operation switching request is issued, the ECU 10 performs the deceleration control based on the target speed Vtgt. Specifically, the ECU 10 calculates a target acceleration Gtgt' for the specific control such that the speed SPD of the vehicle VA becomes equal to the target speed Vtgt at the driving operation switching time point. The ECU 10 controls the brake actuator 31 and/or the engine actuator 21 such that the acceleration of the vehicle VA matches (becomes equal to) the target acceleration Gtgt'. In this manner, the ECU 10 can decelerate the vehicle VA in accordance with the situation in front of the vehicle VA (the recognition result of the left white line WL1 and the right white line WL2) at the time when the driving operation switching request is issued.

The driver normally decelerates the vehicle VA before the vehicle VA enters the curve. According to this configuration, the ECU 10 decelerates the vehicle VA such that the speed SPD of the vehicle VA becomes equal to the target speed Vtgt at the driving operation switching time point (e.g., before the vehicle VA enters the curve with poor visibility). Therefore, it is possible to increase the possibility that the vehicle VA travels at a speed desired by the driver at the driving operation switching time point. This can give the driver a sense of ease. Further, after the driving operation switching time point, the driver does not need to decelerate the vehicle VA by his/her driving operation (operation on the brake pedal 12*a*).

Further, it is assumed that the driving operation switching request (second request) is issued due to the abnormality in the driving support system. In this case, since the abnormality has occurred in the component of the vehicle VA, the driver may want to stop the vehicle VA. In a case where the driver operates the brake pedal 12*a* with the normal operation amount after the driving operation switching time point, the vehicle VA is stopped at the position P3 as described above. Actually, the vehicle VA is decelerated until the driving operation switching time point, and therefore, the vehicle VA is stopped at a position slightly short of the position P3. The position P3 is a position corresponding to the farthest portion (edge Eg1) of the left white line WL1 which can be recognized from the image data acquired when the driving operation switching request is issued. In other words, the position P3 is a position immediately before the vehicle VA enters the left curve with poor visibility. When the driver wants to stop the vehicle VA, the first apparatus can increase the possibility of stopping the vehicle VA immediately before entering the left curve with poor visibility. If the vehicle VA is stopped in the left curve, it is difficult for a driver of another following vehicle to recognize the vehicle VA, and therefore, the following vehicle may approach the vehicle VA. The first apparatus having the above configuration can solve such a problem.

In a case where the target speed Vtgt is equal to or higher than the speed SPD at the time when the driving operation switching request is issued, this situation is considered to be a situation 1 or 2 described below.

(Situation 1): The vehicle VA is traveling on a road with good visibility (straight lane).

(Situation 2): The vehicle VA is traveling at a relatively low speed.

In the above situation 1 or 2, the need to decelerate the vehicle VA is small. Therefore, the ECU 10 controls the engine actuator 21 and/or the brake actuator 31 so as to maintain the speed SPD at the time when the driving operation switching request is issued (that is, the ECU 10 performs the constant speed travel control).

Figure 5:
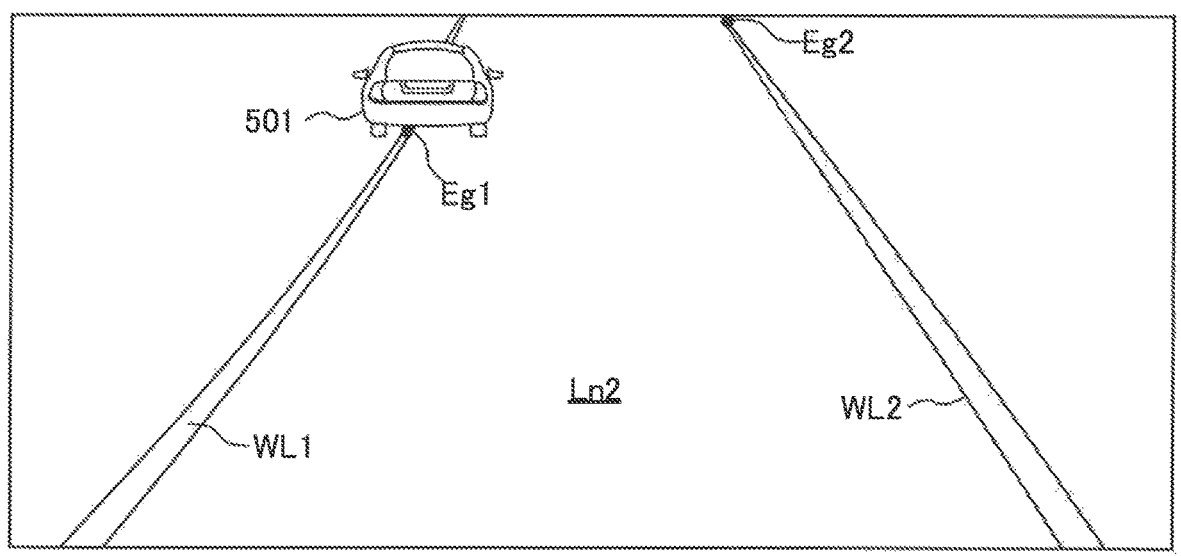
FIG. 5 is a diagram for illustrating image data acquired by the camera sensor of FIG. 1 in a situation in which the vehicle travels in a lane in which an object (a parked other vehicle) exists on a left side of the lane.

FIG. 5 is the image data acquired by the camera sensor 18*b* when the vehicle travels in a lane Ln2. As illustrated in FIG. 5, an object (other parked vehicle 501) is present on the left side of the lane Ln2. In such a situation, the ECU 10 recognizes a position at which the left white line WL1 is interrupted in the image data as the edge Eg1 of the left white line WL1. Therefore, the first distance D1 is shorter than the second distance D2. The ECU 10 calculates the target speed Vtgt according to the expression (1) as described above, and performs the deceleration control based on the target speed Vtgt.

Figure 6:
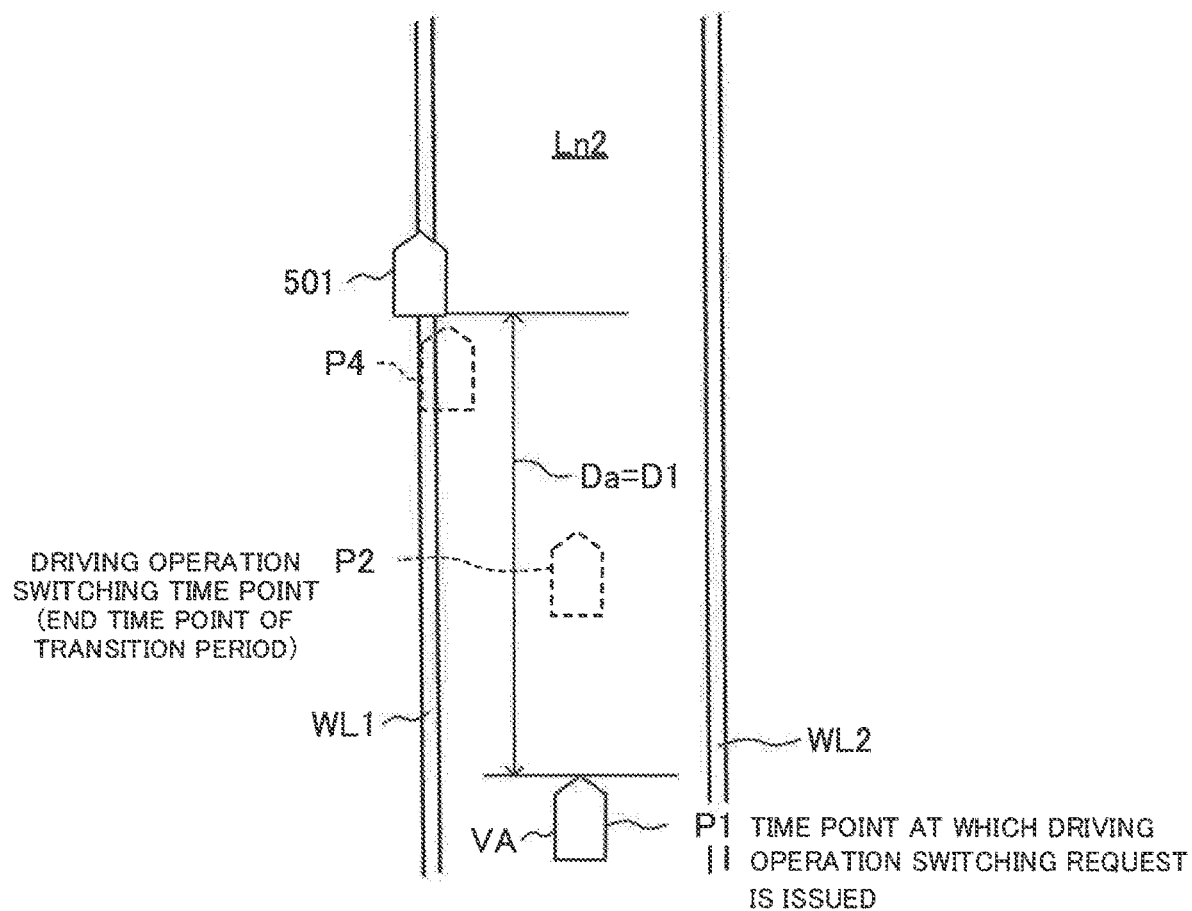
FIG. 6 is a plan view for explaining processing executed when the driving operation switching request is issued in the situation of FIG. 5.

The driver normally decelerates the vehicle VA when the vehicle VA passes on the side of the other vehicle 501. According to this configuration, as illustrated in FIG. 6, the ECU 10 decelerates the vehicle VA such that the speed SPD of the vehicle VA becomes equal to the target speed Vtgt at the driving operation switching time point (i.e., at the position P2 short of the other vehicle 501). Therefore, it is possible to increase the possibility that the vehicle VA travels at a speed desired by the driver at the driving operation switching time point. Further, the driver can pass the vehicle VA on the side of the other vehicle 501 at the desired speed without performing the driving operation (operation on the brake pedal 12*a*) by himself/herself.

It is assumed that the driver wishes to stop the vehicle VA, and thus moves the vehicle VA to the left side of the lane Ln2 while operating the brake pedal 12*a* with the normal operation amount from the driving operation switching time point. In this case, as illustrated in FIG. 6, the vehicle VA is stopped at a position P4 (short of a position which is away from the position P1 by the first distance D1). Therefore, in the case where the driver wishes to stop the vehicle VA, it is possible to increase the possibility that the vehicle is stopped at a position short of the other vehicle 501. Further, it is possible to reduce the possibility that the vehicle VA approaches or collides with the other vehicle 501.

(Operation)

Next, the operation of the CPU 101 of the ECU 10 (hereinafter simply referred to as "CPU") will be described. The CPU is configured to execute a "driving support start/termination determination routine" illustrated in FIG. 7 every time a predetermined time elapses.

Further, every time the predetermined time elapses, the CPU executes a routine (not shown) to acquire the detection signals or output signals from the various sensors 11 to 18 and the operation switch 70, and stores those detection signals or output signals in the RAM 103.

When a predetermined timing has come, the CPU starts the routine from Step 700, and proceeds to Step 701 to determine whether or not a value of a driving support flag X1 is "0". When the value of the driving support flag X1 is "1", this indicates that the driving support operation state is the on state. When the value of the driving support flag X1 is "0", this indicates that the driving support operation state is the off state. The driving support flag X1 and other flags X2 and X3 described later are set to "0" in an initialization routine to be executed by the CPU when a position of an ignition switch (not shown) is changed from an off position to an on position.

When it is now assumed that the driving support operation state is the off state, the value of the driving support flag X1 is "0". In this case, the CPU makes a "Yes" determination in Step 701, and proceeds to Step 702 to determine whether or not an execution condition for the driving support control is satisfied.

The execution condition is satisfied when both of conditions 1 and 2 described below are satisfied. At least one other condition may be added as the execution condition. The same applies to other conditions described below.
(Condition 1): The driving support operation state is set to the on state by operating the operation switch 70.
(Condition 2): The speed SPD of the vehicle VA is equal to or higher than a predetermined speed.

When the execution condition is not satisfied, the CPU makes a "No" determination in Step 702, and proceeds directly to Step 795 to end the current execution of the present routine.

When the execution condition is satisfied, the CPU makes a "Yes" determination in Step 702, and proceeds to Step 703 to set the value of the driving support flag X1 to "1". Thereafter, the CPU proceeds to Step 795 to end the current execution of the present routine. Thus, the driving support operation state is changed from the off state to the on state. In addition, since the CPU makes a "Yes" determination in Step 801 of FIG. 8 as described later, the ACC is started.

Figure 7:
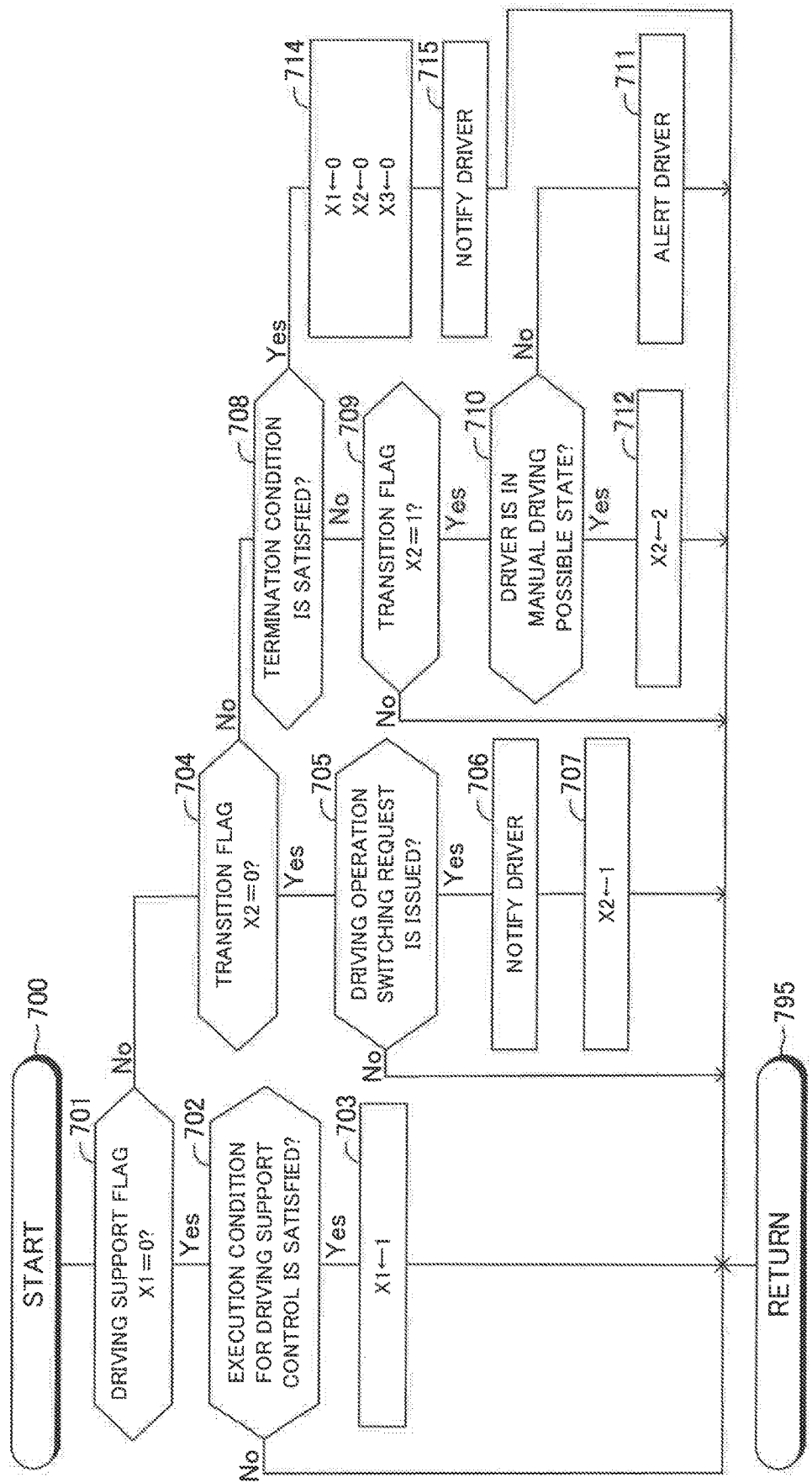
FIG. 7 is a flowchart for illustrating a "driving support start/termination determination routine" to be executed by a driving support ECU.

After the driving support operation state becomes the on state, the CPU again starts the routine of FIG. 7 from Step 700. The CPU makes a "No" determination in Step 701, and proceeds to Step 704. In Step 704, the CPU determines whether a value of a transition flag X2 is "0". When the value of the transition flag X2 is "1", this indicates that the present time is in the transition period. When the value of the transition flag X2 is "2", this indicates that it is already determined in the transition period that the driver is in the manual driving possible state.

It is assumed that the driving support operation state is the on state and the driving operation switching request is not yet issued. In this case, the value of the transition flag X2 is "0". Thus, the CPU makes a "Yes" determination in Step 704, and proceeds to Step 705 to determine whether or not the driving operation switching request is issued. When the driving operation switching request is not yet issued, the CPU makes a "No" determination in Step 705, and proceeds directly to Step 795 to end the current execution of the present routine.

On the other hand, when the driving operation switching request is issued, the CPU makes a "Yes" determination in Step 705, and sequentially executes the processing of Steps 706 and 707 which are described below. Thereafter, the CPU proceeds to Step 795 to end the current execution of the present routine.

Step 706: The CPU controls the display ECU 60 to display on the display 61 a message that it enters the transition period for changing the driving support operation state from the on state to the off state. Further, the CPU causes the speaker 62 to utter the message. In this manner, the CPU notifies the driver of the start of the transition period.

Step 707: The CPU sets the value of the transition flag X2 to "1" to thereby indicate that the present time is during the transition period.

Thereafter, the CPU again starts the routine of FIG. 7 from Step 700. The CPU makes a "No" determination in Step 701, makes a "No" determination in Step 704, and proceeds to Step 708. In Step 708, the CPU determines whether or not a termination condition for the driving support control is satisfied. The termination condition is satisfied when an elapsed time Tep since the driving operation switching request is issued (in this example, an elapsed time since the transition flag X2 is set to "1") has reached a predetermined time threshold Tmth.

It is assumed that the present time is immediately after the value of the transition flag X2 is set to "1". The CPU makes a "No" determination in Step 708, and proceeds to Step 709. Next, in Step 709, the CPU determines whether or not the value of the transition flag X2 is "1". Since the value of the transition flag X2 is "1" at the present time, the CPU makes a "Yes" determination in Step 709, and proceeds to Step 710 to determine whether or not the driver is in the manual driving possible state. Specifically, the CPU determines whether the above-described conditions A and B are both satisfied.

The driver normally does not operate the accelerator pedal 11a and the brake pedal 12a during the performance of the ACC. In many cases, the driver is not in any one of the states 1 and 2 at the start of the transition period. Thus, the CPU makes a "No" determination in Step 710, and proceeds to Step 711 to display on the display 61 an alert message urging the driver to be in the manual driving possible state. Further, the CPU causes the speaker 62 to output the alert message. Thereafter, the CPU proceeds to Step 795 to end the current execution of the present routine.

Then, it is assumed that the driver has become the manual driving possible state in response to the alert message. In this case, when the CPU proceeds to Step 710 via Steps 701, 704, 708 and 709, the CPU makes a "Yes" determination. Next, in Step 712, the CPU sets the value of the transition flag X2 to "2" to thereby indicate that the driver is in the manual driving possible state in the transition period.

Therefore, when the CPU next proceeds to Step 709, the CPU makes a "No" determination, and proceeds directly to Step 795 to end the current execution of the present routine.

The elapsed time Tep has reached the time threshold Tmth while the above-described processing is repeatedly executed. That is, the termination condition is satisfied. In this case, when the CPU proceeds to Step 708, the CPU makes a "Yes" determination, and sequentially executes the processing of Steps 714 and 715 which are described below. Thereafter, the CPU proceeds to Step 795 to end the current execution of the present routine.

Step 714: The CPU sets the value of the driving support flag X1 to "0", sets the value of the transition flag X2 to "0", and sets a value of a specific control flag X3 to "0". When the value of the specific control flag X3 is "1", this indicates that the specific control is being executed as described later.

Step 715: The CPU displays on the display 61 a message informing that the driving support operation state is changed to the off state. Further, the CPU causes the speaker 62 to utter the message.

Therefore, since the CPU makes a "No" determination in Step 801 of FIG. 8 as described later, the ACC is terminated.

Figure 8:
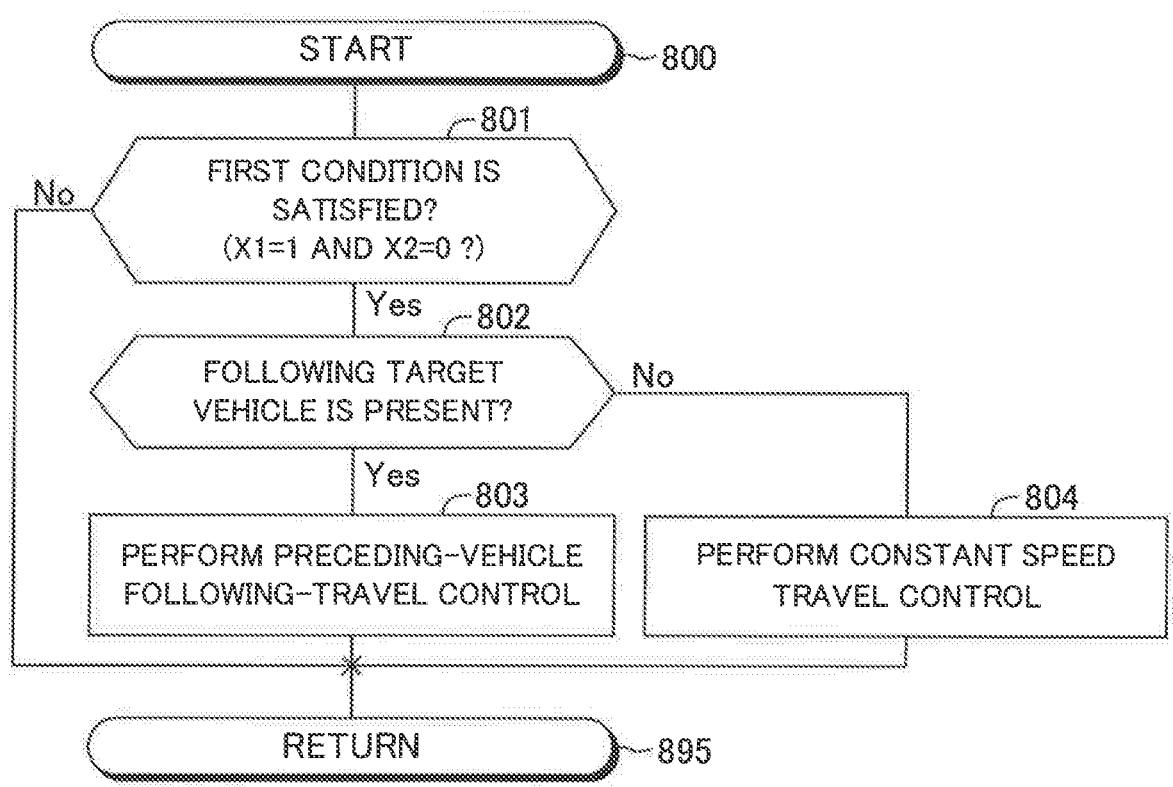
FIG. 8 is a flowchart for illustrating an "ACC execution routine" to be executed by the driving support ECU.

Further, the CPU is configured to execute an "ACC execution routine" illustrated in FIG. 8 every time a predetermined time elapses. When a predetermined timing has come, the CPU starts the process from Step 800 of FIG. 8, and proceeds to Step 801 to determine whether or not a first condition is satisfied. The first condition is satisfied when the driving support operation state is the on state, and the driving operation switching request is not yet issued. Specifically, the first condition is satisfied when the value of the driving support flag X1 is "1" and the value of the transition flag X2 is "0".

When the first condition is not satisfied, the CPU makes a "No" determination in Step 801, and proceeds directly to Step 895 to end the current execution of the present routine.

On the other hand, when the first condition is satisfied, the CPU makes a "Yes" determination in Step 801, and proceeds to Step 802. In Step 802, the CPU determines whether or not the following target vehicle is present ahead of the vehicle VA based on the object information. When the following target vehicle is present, the CPU makes a "Yes" determination in Step 802, and proceeds to Step 803 to perform the preceding-vehicle following-travel control. Thereafter, the CPU proceeds to Step 895 to end the current execution of the present routine.

Meanwhile, when the following target vehicle is not present, the CPU makes a "No" determination in Step 802, and proceeds to Step 804 to perform the constant speed travel control. Thereafter, the CPU proceeds to Step 895 to end the current execution of the present routine.

Figure 9:
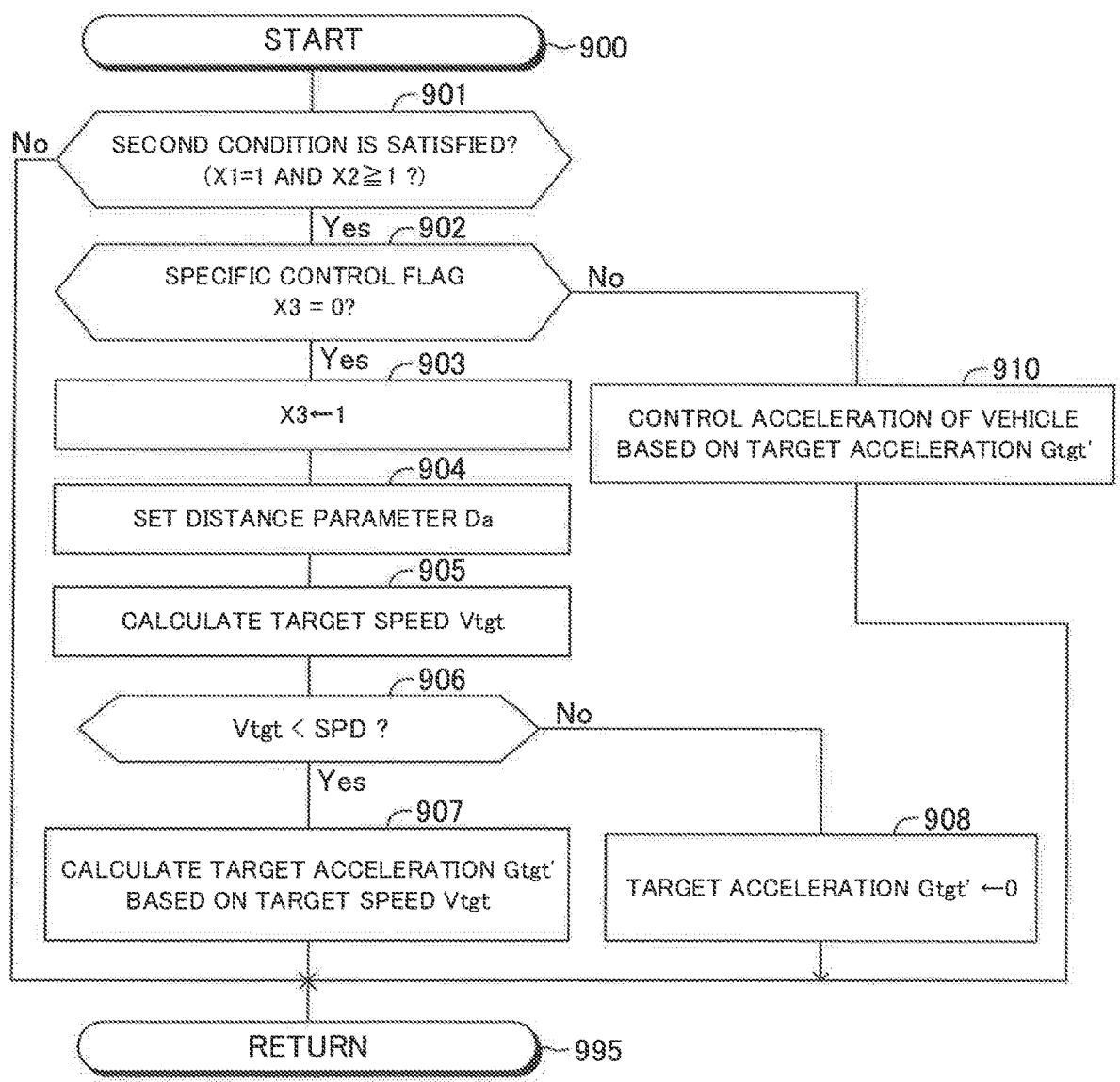
FIG. 9 is a flowchart for illustrating a "specific control execution routine" to be executed by the driving support ECU.

Furthermore, the CPU is configured to execute a "specific control execution routine" illustrated in FIG. 9 every time a predetermined time elapses. When a predetermined timing has come, the CPU starts the process from Step 900 of FIG. 9, and proceeds to Step 901 to determine whether or not a second condition is satisfied. The second condition is satisfied when the driving support operation state is the on state, and the driving operation switching request is issued. Specifically, the second condition is satisfied when the value of the driving support flag X1 is "1" and the value of the transition flag X2 is equal to or larger than "1" (i.e., either "1" or "2").

When the second condition is not satisfied, the CPU makes a "No" determination in Step 901, and proceeds directly to Step 995 to end the current execution of the present routine.

On the other hand, when the second condition is satisfied, the CPU makes a "Yes" determination in Step 901, and proceeds to Step 902 to determine whether or not the value of the specific control flag X3 is "0". It is assumed that the present time is a time point immediately after the transition flag X2 is set to "1". In this case, the specific control flag X3 is still "0". Thus, the CPU makes a "Yes" determination in Step 902, and sequentially executes the processing of Steps 903 to 905 which are described below. Thereafter, the CPU proceeds to Step 906.

Step 903: The CPU sets the value of the specific control flag X3 to "1" to thereby indicate that the specific control is started.

Step 904: The CPU sets the distance parameter Da as described above. Specifically, the CPU calculates the first distance D1 and the second distance D2 based on the lane information (including the image data acquired by the camera sensor 18b). Then, the CPU sets the smaller one of the first distance D1 and the second distance D2 as the distance parameter Da. When neither the left white line WL1 nor the right white line WL2 can be recognized based on the image data, the CPU sets the default distance Ddef as the distance parameter Da.

Step 905: The CPU calculates the target speed Vtgt according to the expression (1) as described above.

When the CPU proceeds to Step 906, the CPU determines whether the target speed Vtgt is lower than the current speed SPD of the vehicle VA. When the target speed Vtgt is lower than the current speed SPD, the CPU makes a "Yes" determination in Step 906, and proceeds to Step 907. In Step 907, the CPU calculates the target acceleration Gtgt' such that the speed SPD of the vehicle VA becomes equal to the target speed Vtgt at the end time point of the transition period (i.e., the time threshold Tmth after the present time). Thereafter, the CPU proceeds to Step 995 to end the current execution of the present routine.

Meanwhile, when the target speed Vtgt is not lower than the current speed SPD, the CPU makes a "No" determination in Step 906, and proceeds to Step 908 to set the target acceleration Gtgt' to "0".

As the CPU again starts the routine of FIG. 9 from Step 900 after the value of the specific control flag X3 is set to "1", the CPU makes a "No" determination in Step 902, and proceeds to Step 910. The CPU controls the brake actuator 31 and/or the engine actuator 21 such that the acceleration of the vehicle VA matches (becomes equal to) the target acceleration Gtgt'. In the case where the CPU calculates the target acceleration Gtgt' in Step 907, the CPU performs the deceleration control such that the speed SPD of the vehicle VA matches the target speed Vtgt at the end time point of the transition period (i.e., at the driving operation switching time point). After that, when the CPU executes the process in Step 714 of FIG. 7 at the end time point of the transition period, the flags X1, X2, and X3 are set to "0". As a result, since the CPU makes "No" determination in Step 901, the CPU terminates the deceleration control at the end time point of the transition period.

In the case where the CPU sets the target acceleration Gtgt' to "0" in Step 908, the CPU performs the constant speed travel control so as to maintain the speed SPD at the time when the driving operation switching request is issued (i.e., the transition flag X2 is set to "1"). In one or more embodiments, the CPU may calculate the target acceleration Gtgt' as needed such that the speed SPD at the time when the driving operation switching request is issued is maintained.

The first apparatus having the above configuration performs, in place of the constant speed travel control or the preceding-vehicle following-travel control in the ACC, the deceleration control during the transition period such that the speed SPD of the vehicle matches the target speed Vtgt at the driving operation switching time point. Therefore, it is possible to increase the possibility that the vehicle VA travels at a speed desired by the driver at the driving operation switching time point. This can give the driver a sense of ease. Further, when the vehicle VA travels at the desired speed at the driving operation switching time point, the driver does not need to perform the driving operation for decelerating the vehicle (i.e., operation on the brake pedal 12*a*) after the driving operation switching time point. The driver can drive the vehicle VA with the minimum operation (only the operation on the steering wheel SW).

Modification Example 1 of First Apparatus

In one or more embodiments, the CPU may calculate the target speed Vtgt according to the expression (2) described below in Step 905 of the routine of FIG. 9. In the expression (2), α is a gain for the entire target speed Vtgt, and β is a gain for the deceleration Gs. α and β are set (changed) as described below.

$$Vtgt = \alpha \times \sqrt{2|\beta \times Gs| \cdot (Da - (SPD \cdot Tmth))} \quad (2)$$

The CPU determines whether or not the driver is already in the manual driving possible state (that is, both of the conditions A and B are satisfied) in the transition period. When the driver is not yet in the manual driving possible state, the target speed Vtgt may be set to a smaller value in consideration of safety. Thus, when the driver is not yet in the manual driving possible state, the CPU sets the gain α to a predetermined value smaller than "1". On the other hand, when the driver is in the manual driving possible state, the CPU sets the gain α to "1". According to this example, the CPU changes the target speed Vtgt at the driving operation switching time point in accordance with the state of the driver. Since the target speed Vtgt becomes smaller when the driver is not in the manual driving possible state, the safety can be further improved.

In one or more embodiments, the CPU may set the gain α to "1" when the driver is in any one of the above-described states 1 to 3. The CPU may set the gain α to the predetermined value smaller than "1" when the driver is not in any of the states 1 to 3.

In one or more embodiments, the CPU determines whether a road surface state in front of the vehicle VA is a specific road surface state. The specific road surface state herein refers to a state in which the wheels of the vehicle VA are more slippery than an assumed dry road surface state. For example, when it is raining, the wheels of the vehicle VA are slippery because the road surface of the lane is wet. Thus, the CPU determines, based on the signal from the rainfall sensor 17, whether or not the road surface state in front of the vehicle VA is the specific road surface state. When the road surface state in front of the vehicle VA is the specific road surface state, the deceleration Gs cannot be obtained even if the driver operates the brake pedal 12*a* with the normal operation amount. In view of this, when the road surface state in front of the vehicle VA is the specific road surface state, the CPU sets the gain β to a predetermined value smaller than "1". On the other hand, when the road surface state in front of the vehicle VA is not the specific road surface state, the CPU sets the gain β to "1". According to this example, the target speed Vtgt can be changed according to the weather (whether or not it is raining). That is, the CPU sets the target speed Vtgt of when determining the road surface state is the specific road surface state to be smaller than the target speed Vtgt of when determining the road surface state is not the specific road surface state. When the road surface state in front of the vehicle VA is the specific road surface state, the target speed Vtgt becomes smaller, and therefore, the safety can be further improved.

In one or more embodiments, the CPU may acquire weather information from an external network via a communication device (not shown), and determine whether or not it is raining at the current position of the vehicle VA based on the weather information. When it is raining, the CPU determines that the road surface state of the lane is the specific road surface state. In one or more embodiments, the CPU may determine whether or not the road surface state of the lane is wet (that is, whether or not the road surface state is the specific road surface state) based on the image data acquired from the camera sensor 18*b*.

In one or more embodiments, the CPU may calculate the target speed Vtgt according to an expression in which one of the gain α and the gain β is omitted from the expression (2).

Modification Example 2 of First Apparatus

In one or more embodiments, the CPU may obtain the target acceleration Gtgt' for the specific control by using a deceleration map Mc (Da) having the distance parameter Da as an argument. The deceleration map Mc (Da) defines a relationship between the distance parameter Da and the target acceleration Gtgt' which is a negative acceleration. According to this example, the CPU can decelerate the vehicle VA according to the distance parameter Da. In the deceleration map Mc (Da), when the distance parameter Da is larger than a predetermined distance threshold, the target acceleration Gtgt' may be set to "0". In one or more embodiments, the CPU uses a deceleration map Mc (Da, Ea, Ra) to obtain the target acceleration Gtgt' for the specific control. The deceleration map Mc (Da, Ea, Ra) has, as arguments, the distance parameter Da, and one or both of a driver state parameter Ea and a road state parameter Ra. The parameter Ea may be set to "1" when the driver is already in the manual driving possible state in the transition period. The parameter Ea may be set to "0" when the driver is not in the manual driving possible state in the transition period. The parameter Ra may be set to "1" when the road surface state is the specific road surface state. The parameter Ra may be set to "0" when the road surface state is not the specific road surface state. Thus, the target acceleration Gtgt' may be set by using a relationship between the distance parameter Da and the parameters Ea and Ra.

Modification Example 3 of First Apparatus

Figure 10:
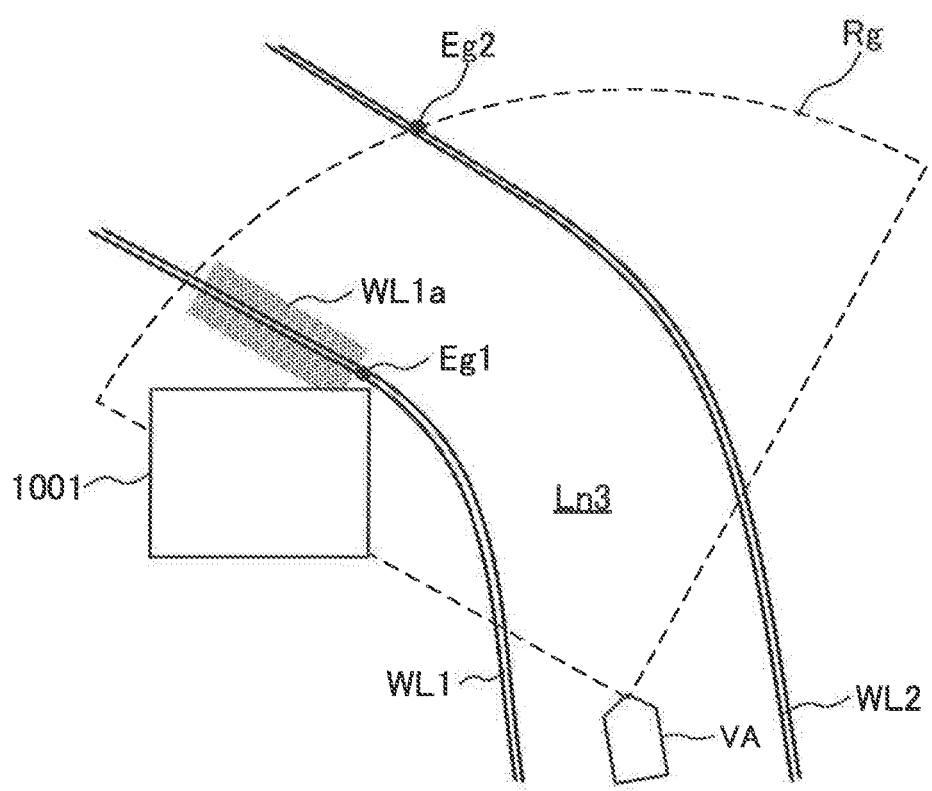
FIG. 10 is a plan view for explaining processing executed when the driving operation switching request is issued in a modification example of the first embodiment.

In one or more embodiments, the ECU 10 may acquire the vehicle-surroundings information based on information other than the image data, and estimate the edge Eg1 of the left white line WL1 and the edge Eg2 of the right white line WL2 based on the vehicle-surroundings information. The ECU 10 acquires the map information and the position of the vehicle VA on the map through the navigation ECU 50. The map information includes information on lane lines around the vehicle VA (i.e., positions of the left white line WL1 and right white line WL2 that define the lane), information on buildings existing around the vehicle VA, and the like. In an example illustrated in FIG. 10, the vehicle VA travels a lane L3. As illustrated in FIG. 10, the ECU 10 sets on the map a range Rg which can be recognized by the driver or the camera sensor 18b from the current position of the vehicle VA. Then, the ECU 10 estimates the edge Eg1 of the left white line WL1 and the edge Eg2 of the right white line WL2 from a relationship between the left white line WL1, the right white line WL2 and a three-dimensional object (building 1001) existing around the vehicle VA. In FIG. 10, it is considered that a shaded portion WL1a of the left white line WL1 cannot be recognized from the current position of the vehicle VA due to the building 1001 existing on the left side of the lane Ln3. Therefore, the ECU 10 determines, as the edge Eg1 of the left white line WL1, a position short of the shaded portion WL1a. Furthermore, since there is no object interrupting the right white line WL2, the ECU 10 determines, as the edge Eg2 of the right white line WL2, a contact point between the farthest edge from the vehicle VA in the range Rg and the right white line WL2.

In one or more embodiments, the three-dimensional object (building 1001) existing along the lane may be detected by the radar sensor 18a. In this configuration, the ECU 10 reflects the position of the three-dimensional object detected by the radar sensor 18a on the map, and estimates the edge Eg1 of the left white line WL1 and the edge Eg2 of the right white line WL2 based on the relationship between the left white line WL1, the right white line WL2 and the three-dimensional object existing around the vehicle VA.

Modification Example 4 of First Apparatus

The method of calculating the first distance D1 and the second distance D2 is not limited to the above example. In one or more embodiments, on the image data, an edge of the left white line WL1 closest to the vehicle VA may be regarded as the "current position of the vehicle VA". The ECU 10 may set, as the first distance D1, a straight line distance between the edge of the left white line WL1 closest to the vehicle VA and the edge Eg1 of the left white line WL1. In one or more embodiments, the ECU 10 may set, as the first distance D1, a curved line distance along the left white line WL1 between the edge of the left white line WL1 closest to the vehicle VA and the edge Eg1 of the left white line WL1. The ECU 10 may set the second distance D2 in the same manner.

Modification Example 5 of First Apparatus

In one or more embodiments, when the following target vehicle is decelerated rapidly during the transition period and the inter-vehicle distance greatly falls below the target inter-vehicle distance Dset, the ECU 10 may decelerate the vehicle VA at a deceleration having an absolute value larger than that of the target acceleration Gtgt'.

Modification Example 6 of First Apparatus

The configuration of the first apparatus may be applied to control other than the ACC. For example, the configuration of the first apparatus may be applied to a control apparatus configured to perform autonomous driving control (control with a higher autonomous driving level than the ACC) for automatically changing the speed of the vehicle such that the speed matches a preset target speed.

Second Embodiment

Next, a control apparatus (hereinafter referred to as "second apparatus") according to a second embodiment will be described. The second apparatus is different from the first apparatus in that the ECU 10 is configured to perform steering control for controlling the steering angle of the vehicle VA in addition to the ACC. Such control is one mode of the driving support control, and is also referred to as "Lane Keeping Assist Control (hereinafter simply referred to as "LKA"). In the present embodiment, the ECU 10 is configured to perform the ACC and the LKA when the driving support operation state is set to the on state by operating the operation switch 70.

(LKA)

The LKA is control for changing the steering angle of the vehicle VA such that the vehicle VA travels along a target travel line set by using the left and right lane lines (see, for example, Japanese Patent Application Laid-open No. 2008-195402, Japanese Patent Application Laid-open No. 2009-190464, Japanese Patent Application Laid-open No. 2010-6279, and Japanese Patent No. 4349210).

Figure 11:
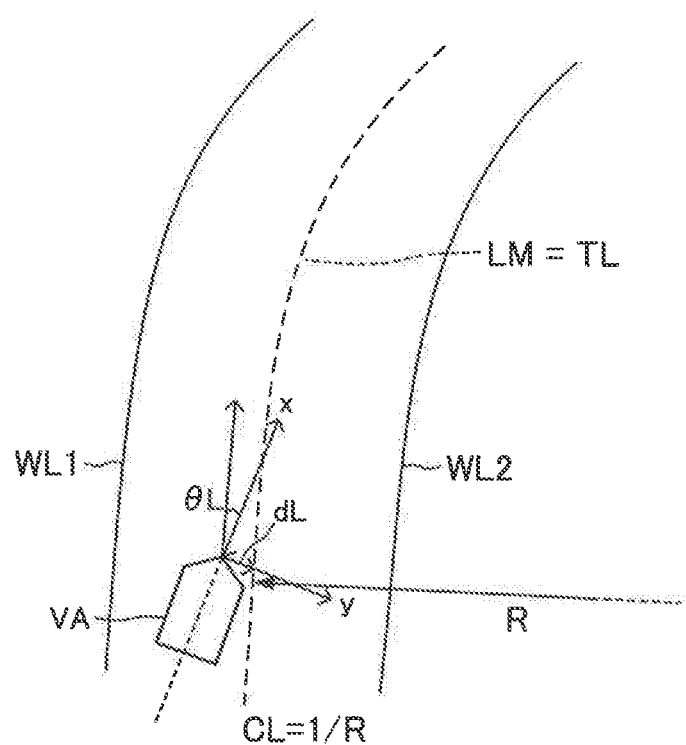
FIG. 11 is a plan view for explaining steering control (LKA) executed in a control apparatus for the vehicle according to a second embodiment, and illustrating a target travel line set based on a center line of a lane.

As illustrated in FIG. 11, it is assumed that the ECU 10 can acquire, based on the lane information, information on the left white line WL1 and the right white line WL2 which define the lane. The ECU 10 estimates, as a "center line LM of the lane", a line connecting center positions between the left white line WL1 and the right white line WL2 in a road widthwise direction to one another. The ECU 10 sets the center line LM as a target travel line TL.

In FIG. 11, a center axis extending in a front-rear direction of the vehicle VA is set as an x-axis, and the axis orthogonal to the x-axis is set as a y-axis. The ECU 10 calculates LKA control parameters for performing the LKA. As illustrated in FIG. 11, the LKA control parameters include a curvature CL of the target travel line TL, a distance dL, a yaw angle θL, and the like. The curvature CL is a reciprocal of a curvature radius R of the center line LM. The distance dL is a distance in the y-axis direction (substantially the road widthwise direction) between the target travel line TL and the center position of the vehicle VA in a vehicle widthwise direction. The yaw angle θL is an angle between the axis extending in the front-rear direction of the vehicle VA and the target travel line TL.

The ECU 10 uses the LKA control parameters to calculate a target steering angle θ* for causing the vehicle VA to travel along the target travel line TL. The ECU 10 transmits a steering command (including the target steering angle θ*) to the steering ECU 10 to thereby drive the motor 42. As a result, the actual steering angle of the vehicle VA matches the target steering angle θ*.

(Control During Transition Period)

In the situation in FIG. 4, it is difficult for the driver to recognize the condition of the left curve from the current position of the vehicle VA at the time when the driving operation switching request is issued. After the driving operation switching time point, the driver drives the vehicle VA by his/her driving operation. In view of this, the ECU 10 causes the vehicle VA to travel such that the driver can easily recognize the situation of the left curve at the driving operation switching time point.

The ECU 10 resets the target travel line TL at the time when the driving operation switching request is issued. Specifically, the ECU 10 selects the white line corresponding to the longer one of the first distance D1 and the second distance D2 as a specific lane line. The ECU 10 newly sets the target travel line TL by shifting (displacing) to the specific lane line side the target travel line (center line LM) which has been used until the driving operation switching request is issued. In the situation of FIG. 4, the second distance D2 is longer than the first distance D1. Thus, the ECU 10 selects the right white line WL2 as the specific lane line. The ECU 10 sets the target travel line TL by shifting the center line LM to the side of the right white line WL2.

Figure 12:
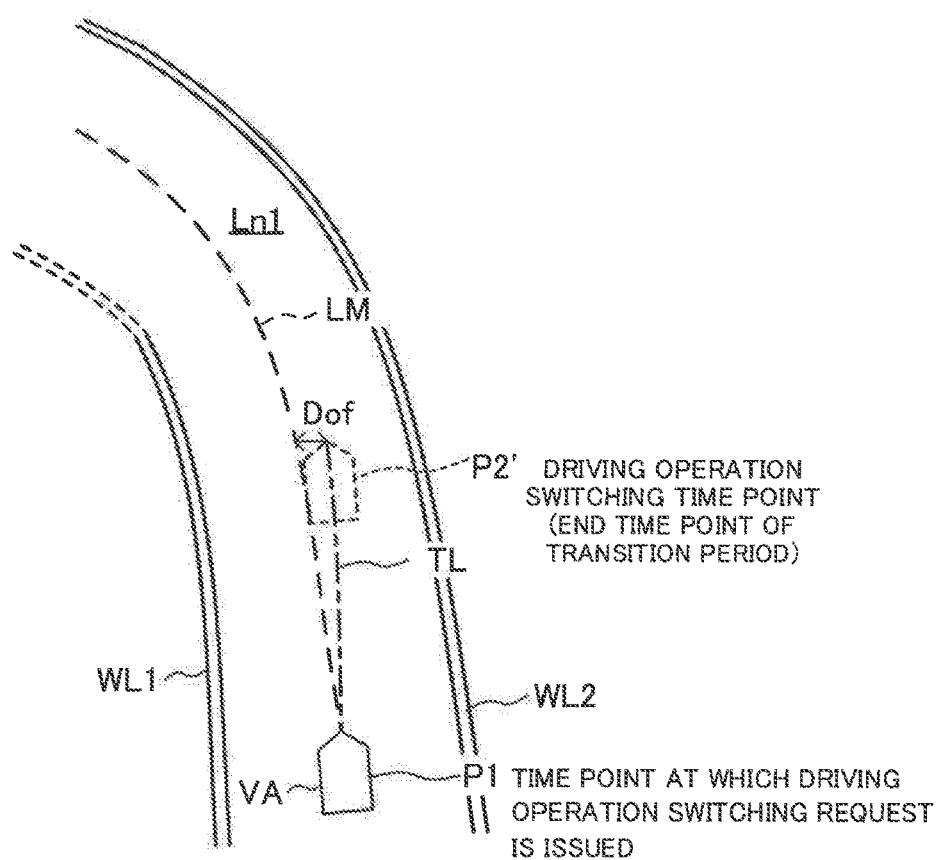
FIG. 12 is a plan view for explaining processing executed when the driving operation switching request is issued in the situation of FIG. 2 in the second embodiment.

As illustrated in FIG. 12, the ECU 10 sets the target travel line TL (dashed-dotted line) such that the vehicle VA travels at a position P2' at the driving operation switching time point (i.e., at the end time point of the transition period). The position P2' is a position separated from the original target travel line (center line LM) used until the driving operation switching request is issued, toward the side of the right white line WL2 by a predetermined shift distance Dof. The shift distance Dof is set such that the vehicle body of the vehicle VA does not deviate from the lane Ln1 (in this example, the vehicle body does not cross the right white line WL2). The ECU 10 performs the steering control such that the vehicle VA travels along the target travel line TL during the transition period. According to this configuration, the vehicle VA travels at the position P2' where the driver can easily recognize the situation of the left curve (position on the right side of the center line LM) at the driving operation switching time point. After the driving operation switching time point, the driver can easily drive the vehicle VA on the left curve.

Figure 13:
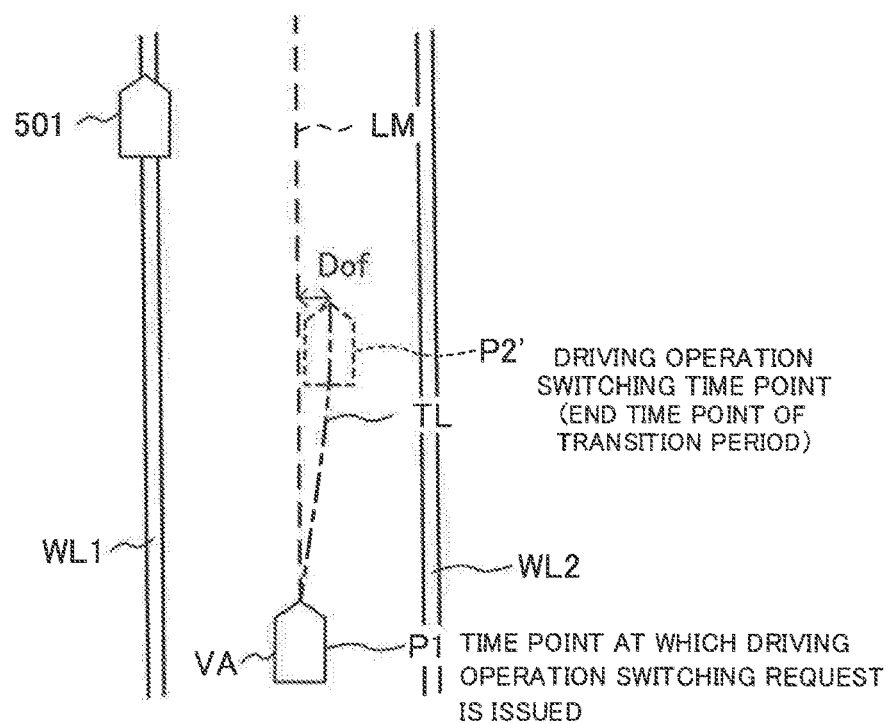
FIG. 13 is a plan view for explaining processing executed when the driving operation switching request is issued in the situation of FIG. 5 in the second embodiment.

Further, the second apparatus has an effect also in the situation of FIG. 5. As illustrated in FIG. 13, the ECU 10 shifts (displaces) the target travel line TL (=LM) toward the side of the right white line WL2 (specific lane line) corresponding to the second distance D2. The ECU 10 sets the target travel line TL (dashed-dotted line) such that the vehicle VA travels at the position P2' at the driving operation switching time point.

After the driving operation switching time point, the vehicle VA passes on the side of the other vehicle 501. According to this configuration, the vehicle VA travels so as to gradually away from the other vehicle 501 during the transition period. Therefore, it is possible to give the driver a sense of ease. Further, after the driving operation switching time point, the driver can drive the vehicle VA at a distance from the other vehicle 501 without operating the steering wheel SW.

(Operation)

The CPU of the ECU 10 in the second apparatus is configured to execute the routines of FIGS. 7 to 9 and 14. However, in this embodiment, the execution condition for the driving support control in Step 702 is different from that of the first embodiment. Further, the condition in Step 710 is also different from that of the first embodiment. A description is now mainly given of those differences.

In Step 702, when all the following conditions 1 to 3 are satisfied, the CPU determines that the execution condition is satisfied.

(Condition 1): The driving support operation state is set to the on state by operating the operation switch 70.
(Condition 2): The speed SPD of the vehicle VA is equal to or higher than the predetermined speed.
(Condition 3): The left white line WL1 and the right white line WL2 have been detected/recognized.

In Step 710, when all the following conditions A to C are satisfied, the CPU determines that the driver is in the manual driving possible state.

(Condition A): The driver is in the above-described state 1 or 2.
(Condition B): The driver is in the above-described state 3.
(Condition C): The driver is in a state 4 described below.
(State 4): The driver holds the steering wheel SW. The ECU 10 can determine whether the driver holds the steering wheel SW based on the signal from the touch sensor 14.

Figure 14:
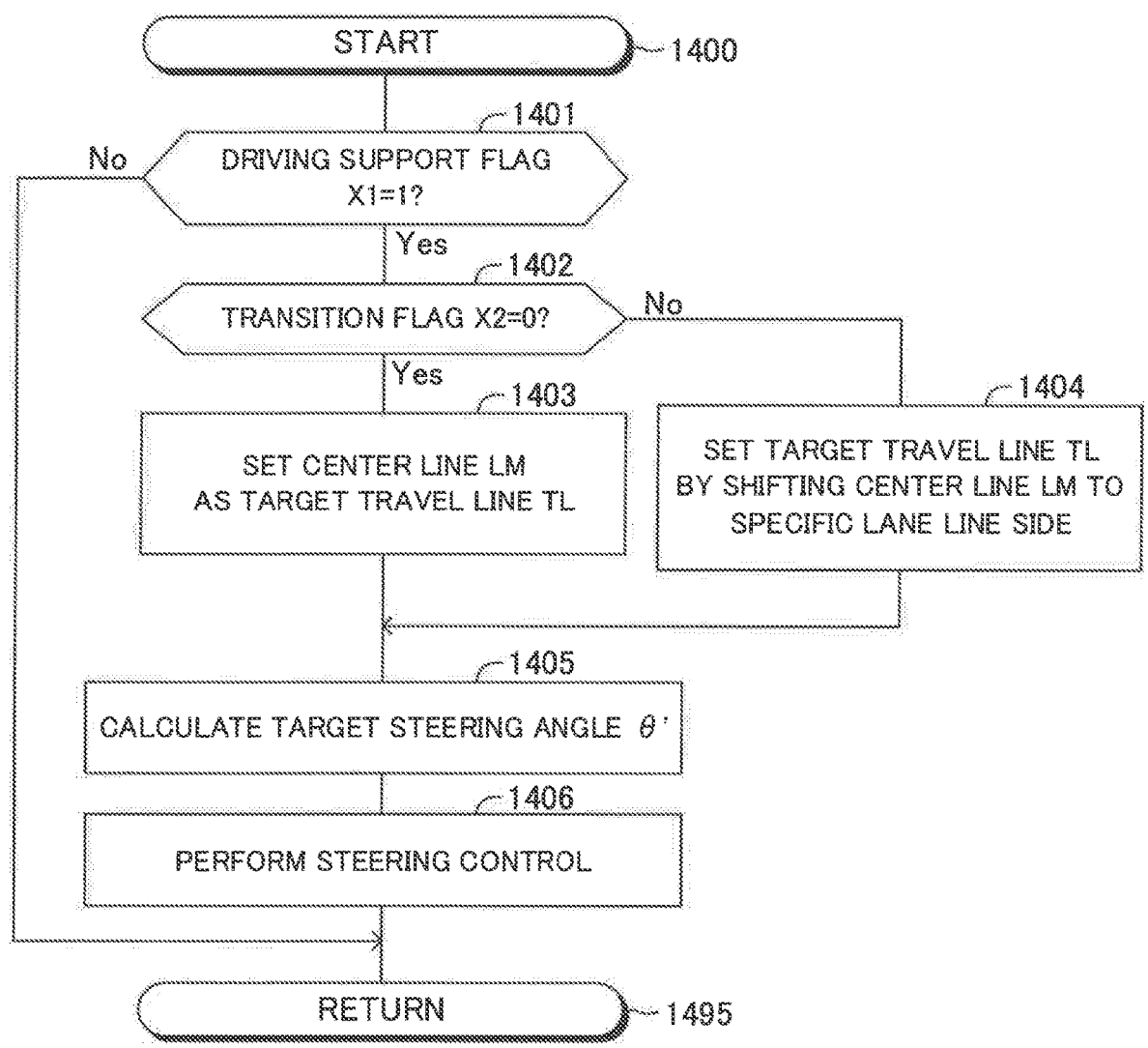
FIG. 14 is a flowchart for illustrating an "LKA execution routine" to be executed by the CPU of the driving support ECU.

Further, when a predetermined timing has come, the CPU starts an "LKA execution routine" illustrated in FIG. 14 from Step 1400. When the CPU proceeds to Step 1401, the CPU determines whether or not the value of the driving support flag X1 is "1". When the value of the driving support flag X1 is not "1", the CPU makes a "No" determination in Step 1401, and proceeds directly to Step 1495 to end the current execution of the present routine.

Meanwhile, when the value of the driving support flag X1 is "1", the CPU makes a "Yes" determination in Step 1401, and proceeds to Step 1402 to determine whether or not the value of the transition flag X2 is "0". When the value of the transition flag X2 is "0", the CPU makes a "Yes" determination in Step 1402, and sequentially executes the processing of Steps 1403, 1405 and 1406 which are described below. Thereafter, the CPU proceeds to Step 1495 to end the current execution of the present routine.

Step 1403: The CPU sets the center line LM as the target travel line TL as described above.

Step 1405: The CPU calculates the target steering angle θ* by using the LKA control parameters (CL, dL, θL) as described above.

Step 1406: The CPU transmits the steering command (including the target steeling angle θ*) to the steering ECU 40 as described above, to thereby execute the steering control.

On the other hand, when the value of the transition flag X2 is not "0" at the time point at which the CPU proceeds to Step 1402, this indicates that the present time is during the transition period. Thus, the CPU makes a "No" determination in Step 1402, and proceeds to Step 1404. In Step 1404, the CPU sets the target travel line TL by shifting the center line LM to the side of the specific lane line. Specifically, the CPU selects, as the specific lane line, the white line corresponding to the longer one of the first distance D1 and the second distance D2. Then, the CPU sets the target travel line TL by shifting the center line LM toward the specific lane line side.

Next, the CPU sequentially executes the processing of Steps 1405 and 1406 as described above. Thereafter, the CPU proceeds to Step 1495 to end the current execution of the present routine.

In the above manner, the second apparatus newly sets the target travel line TL by shifting to the specific lane line side the target travel line TL (=the center line LM) which has been used until the driving operation switching request is issued. According to this configuration, in the situation of FIG. 4, at the driving operation switching time point, the vehicle VA travels at the position where the driver can easily recognize the situation of the curve. Further, in the situation of FIG. 5, the vehicle VA travels at a distance from the other vehicle 501 at the driving operation switching time point.

Modification Example 1 of Second Apparatus

Figure 15:
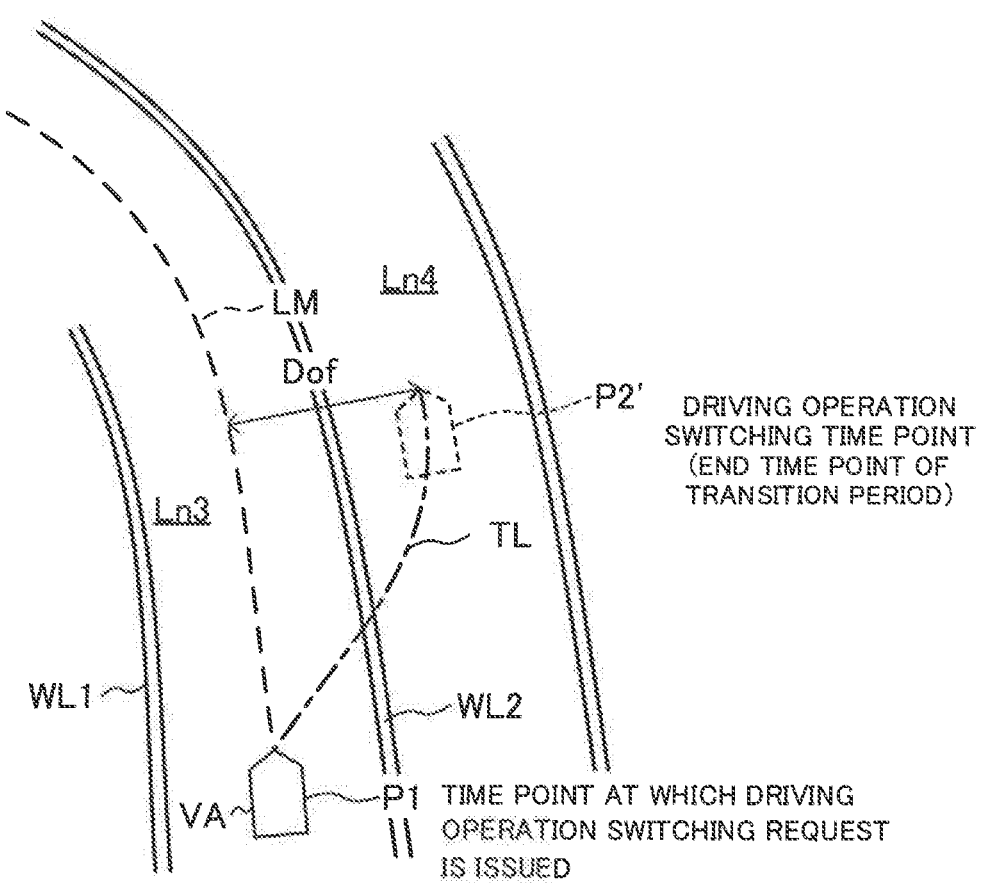
FIG. 15 is a plan view for explaining processing executed when the driving operation switching request is issued in a modification example of the second embodiment.

In a situation of FIG. 15, the vehicle VA travels on a road having two lanes Ln3 and Ln4 (traveling lanes having the same travel direction) are adjacent to each other. In one or more embodiments, the shift distance Dof may be set to a value such that the vehicle VA moves to the adjacent lane. When the vehicle VA travels in the lane Ln3, the shift distance Dof may be set such that the vehicle VA moves to the adjacent lane Ln4. According to this example, at the driving operation switching time point, the vehicle VA travels at a position where the driver can easily recognize the situation of the left curve (that is, position P2' in the lane Ln4 on the outer side of the left curve).

Modification Example 2 of Second Apparatus

The configuration of the second apparatus may be applied to control other than the LKA. For example, the configuration of the second apparatus may be applied to a control apparatus configured to perform autonomous driving control (control with a higher autonomous driving level than the LKA) for automatically changing the steering angle such that the vehicle travels along a predetermined target travel line.

Modification Example 3 of Second Apparatus

In the second apparatus, the ECU 10 starts both of the ACC and the LKA when the driving support operation state becomes the on state, but is not limited to this configuration. In one or more embodiments, the ECU 10 may be configured to change the operation state of the ACC and the operation state of the LKA to the on state independently of each other.

The present disclosure is not limited to the above-described embodiments, and various modification examples can be adopted within the scope of the present disclosure.

The timing at which the driving operation switching request is issued is not limited to the above example. In one or more embodiments, the driving operation switching request may be issued when the lane has a curvature that exceeds the limit that can be supported by the driving support control (that is, the road is a sharp curve), or when the lane has an undulation that exceeds the limit that can be supported by the driving support control.

What is claimed is:

1. A control apparatus for a vehicle, comprising:
an information acquisition device configured to acquire vehicle-surroundings information which is information on a surroundings situation of the vehicle; and
a controller configured to perform driving support control including at least speed control for controlling a speed of the vehicle when a driving support operation state is an on state, and when the driving support operation state is the on state and a driving operation switching request for changing the driving support operation state from the on state to an off state is issued, change the driving support operation state from the on state to the off state at a driving operation switching time point at which a predetermined time has elapsed from a request time point at which the driving operation switching request is issued,
wherein the controller is configured to, when the driving support operation state is the on state and the driving operation switching request is issued,
calculate a target speed at the driving operation switching time point in accordance with a situation in front of the vehicle determined based on the vehicle-surroundings information acquired at the request time point,
perform deceleration control in place of the speed control, the deceleration control being control such that the speed of the vehicle matches the target speed at the driving operation switching time point, and
terminate the deceleration control at the driving operation switching time point,
wherein the information acquisition device is configured to acquire, as the vehicle-surroundings information, image data including a left lane line and a right lane line which define a lane in which the vehicle travels, and
wherein the controller is further configured to,
calculate a first distance and a second distance, the first distance being a distance between a position of the vehicle at the request time point and an edge of the left lane line, which is farthest in a travel direction of the vehicle regardless of whether the left lane is straight or curved, recognized from the image data at the request time point, and the second distance being a distance between the position of the vehicle at the request time point and an edge of the right lane line, which is farthest in the travel direction of the vehicle regardless of whether the right lane is straight or curved, recognized from the image data at the request time point,
select a shorter one of the first distance and the second distance as a distance parameter, and
calculate the target speed by using the distance parameter.

2. The control apparatus according to claim 1, wherein the controller is further configured to, when the driving support operation state is the on state and the driving operation switching request is issued,
determine whether or not a road surface state in front of the vehicle is a specific road surface state in which wheels of the vehicle are more slippery than an assumed dry road surface state, and
set the target speed of when determining the road surface state is the specific road surface state to be smaller than the target speed of when determining the road surface state is not the specific road surface state.

3. The control apparatus according to claim 1, wherein the controller is further configured to perform, as the driving support control, steering control for controlling a steering angle of the vehicle such that the vehicle travels along a predetermined target travel line, and
the controller is further configured to, when the driving support operation state is the on state and the driving operation switching request is issued,
set the target travel line by shifting to a side of a specific lane line of the target travel line used until the request time point, the specific lane line being a lane line corresponding to a longer one of the first distance and the second distance, and
perform the steering control such that the vehicle travels along the set target travel line.

4. The control apparatus according to claim 1, wherein the controller is further configured to set, as the target speed, a speed allowing the vehicle to be stopped at a position away from the position at the request time point of the vehicle by the distance parameter, under an assumption that a driver decelerates the vehicle at a predetermined deceleration after the driving operation switching time point.

5. The control apparatus according to claim 1, wherein the controller is further configured to, when the driving support operation state is the on state and the driving operation switching request is issued,
   determine whether or not a driver is in a manual driving possible state in which the driver can drive the vehicle, and
   set the target speed of when determining the driver is not in the manual driving possible state to be smaller than the target speed of when determining the driver is in the manual driving possible state.

6. A control method for a vehicle including an information acquisition device and a controller, the control method comprising:
   acquiring by the information acquisition device vehicle-surroundings information which is information on a surroundings situation of the vehicle; and
   performing by the controller driving support control including at least speed control for controlling a speed of the vehicle when a driving support operation state is an on state,
   wherein the control method comprises: in a case where the driving support operation state is the on state and a driving operation switching request for changing the driving support operation state from the on state to an off state is issued,
      changing by the controller the driving support operation state from the on state to the off state at a driving operation switching time point at which a predetermined time has elapsed from a request time point at which the driving operation switching request is issued,
      calculating by the controller a target speed at the driving operation switching time point in accordance with a situation in front of the vehicle determined based on the vehicle-surroundings information acquired at the request time point,
      performing by the controller deceleration control in place of the speed control, the deceleration control being control such that the speed of the vehicle matches the target speed at the driving operation switching time point, and
      terminating by the controller the deceleration control at the driving operation switching time point
   wherein the acquiring the vehicle-surroundings information further comprises acquiring, as the vehicle-surroundings information, image data including a left lane line and a right lane line which define a lane in which the vehicle travels, and
   wherein the control method further comprises: in the case where the driving support operation state is the on state and the driving operation switching request is issued,
      calculating by the controller a first distance and a second distance, the first distance being a distance between a position of the vehicle at the request time point and an edge of the left lane line, which is farthest in a travel direction of the vehicle regardless of whether the left lane is straight or curved, recognized from the image data at the request time point, and the second distance being a distance between the position of the vehicle at the request time point and an edge of the right lane line, which is farthest in the travel direction of the vehicle regardless of whether the right lane is straight or curved, recognized from the image data at the request time point,
      selecting by the controller a shorter one of the first distance and the second distance as a distance parameter, and
      calculating by the controller the target speed by using the distance parameter.

7. The control method according to claim 6, further comprising: when the driving support operation state is the on state and the driving operation switching request is issued,
   determining by the controller whether or not a road surface state in front of the vehicle is a specific road surface state in which wheels of the vehicle are more slippery than an assumed dry road surface state, and
   setting by the controller the target speed of when determining the road surface state is the specific road surface state to be smaller than the target speed of when determining the road surface state is not the specific road surface state.

8. The control method according to claim 6, further comprising: when the driving support operation state is the on state and the driving operation switching request is issued,
   determining by the controller whether or not a driver is in a manual driving possible state in which the driver can drive the vehicle,
   setting by the controller the target speed of when determining the driver is not in the manual driving possible state to be smaller than the target speed of when determining the driver is in the manual driving possible state.

9. The control method according to claim 6, wherein the performing the driving support control further comprises performing, as the driving support control, steering control for controlling a steering angle of the vehicle such that the vehicle travels along a predetermined target travel line, and
   wherein the control method further comprises: when the driving support operation state is the on state and the driving operation switching request is issued,
      setting by the controller the target travel line by shifting to a side of a specific lane line the target travel line used until the request time point, the specific lane line being a lane line corresponding a longer one of the first distance and the second distance, and
      performing by the controller the steering control such that the vehicle travels along the set target travel line.

10. The control method according to claim 6, further comprising setting, as the target speed, a speed allowing the vehicle to be stopped at a position away from the position at the request time point of the vehicle by the distance parameter, under an assumption that a driver decelerates the vehicle at a predetermined deceleration after the driving operation switching time point.

* * * * *